US012731214B2

(12) United States Patent
Elliot

(10) Patent No.: US 12,731,214 B2
(45) Date of Patent: Sep. 8, 2026

(54) TRANSFORMED COEFFICIENT ORDERING FOR ENTROPY CODING

(71) Applicant: V-NOVA INTERNATIONAL LIMITED, London (GB)

(72) Inventor: Max Elliot, London (GB)

(73) Assignee: V-NOVA INTERNATIONAL LIMITED, London (GB)

(*) Notice: Subject to any disclaimer, the term of this patent is extended or adjusted under 35 U.S.C. 154(b) by 645 days.

(21) Appl. No.: 17/995,669

(22) PCT Filed: Apr. 14, 2021

(86) PCT No.: PCT/GB2021/050892
§ 371 (c)(1),
(2) Date: Oct. 6, 2022

(87) PCT Pub. No.: WO2021/209748
PCT Pub. Date: Oct. 21, 2021

(65) Prior Publication Data

US 2023/0141312 A1 May 11, 2023

(30) Foreign Application Priority Data

Apr. 14, 2020 (GB) ...................................... 2005451
Apr. 19, 2020 (GB) ...................................... 2005658

(51) Int. Cl.
*G06T 3/4084* (2024.01)
*G06T 9/00* (2006.01)

(52) U.S. Cl.
CPC .............. *G06T 3/4084* (2013.01); *G06T 9/00* (2013.01)

(58) Field of Classification Search
CPC ......... G06T 3/4084; G06T 9/00; H04N 19/12; H04N 19/129; H04N 19/33; H04N 19/436; H04N 19/91; H04N 19/93
See application file for complete search history.

(56) References Cited

U.S. PATENT DOCUMENTS 4,597,005 A * 6/1986 Baleshta ................ H04N 1/646 348/463
5,589,885 A * 12/1996 Ooi ........................ H04N 19/42 348/700

(Continued)

FOREIGN PATENT DOCUMENTS

CA 2763489 A1 7/2012
CN 1345516 A 4/2002

(Continued)

OTHER PUBLICATIONS

Draft Text of ISO/IEC DIS 23094-2 Low Complexity Enhancement Video Coding, 129. MPEG MEETING; Jan. 13, 2020-Jan. 17, 2020; Brussels; (Motion Picture Expert Group or ISO/IEC JTC1/SC29/WVG11), No. n18986, Mar. 8, 2020 (Mar. 8, 2020), XP030285323, retrieved from the Internet: URL: http:/phenix._int-evry.fr/mpeg/doc end user/documents/129 Brussels/wg11/w18986.zip, N18986 Dis—v1 final.docx [retrieved on Mar. 8, 2020].

(Continued)

*Primary Examiner* — Peter D Le
(74) *Attorney, Agent, or Firm* — Workman Nydegger

(57) ABSTRACT

The present disclosure provides a method for encoding input data in an encoder to generate encoded output data, wherein the method includes: instructing the conversion of the input data into base-layer reconstruction data using a down-sampled version of the input data; and generating enhancement-layer data that provides instructions for enhancing the base-layer reconstruction data, wherein the enhancement-layer data comprises residual data representing a difference between a reconstruction generated from the base-layer reconstruction data and data derived from the input data, wherein the residual data are subjected to at least one transform and at least one data compression method to generate the encoded output data, characterized in that the method includes: arranging for the at least one transform to (Continued)

include a Hadamard transform to convert the residual data to corresponding transform coefficients, wherein different output elements of the Hadamard transform are arranged as different surfaces to be encoded, and selecting an output order for the transform coefficients in the surfaces to provide a sequence of transform coefficients for the at least one data compression method to generate the encoded output data, wherein the output order is selected as one of at least a tile raster order and a n-by-n block "Z"-order.

16 Claims, 14 Drawing Sheets

(56) References Cited

U.S. PATENT DOCUMENTS 6,480,547 B1 11/2002 Chen et al.
11,706,412 B2 * 7/2023 Stepin .................. H04N 19/159 375/240.02
2004/0202376 A1 10/2004 Schwartz
2006/0013308 A1 * 1/2006 Kim ....................... H04N 19/33 375/E7.185
2006/0056520 A1 * 3/2006 Comer ............... G11B 20/1262 375/E7.187
2006/0109150 A1 * 5/2006 Naito ...................... H03M 7/42 341/67
2006/0120450 A1 * 6/2006 Han ....................... H04N 19/61 375/240.18
2006/0233250 A1 * 10/2006 Cha ...................... H04N 19/176 375/E7.176
2007/0086515 A1 * 4/2007 Kirkenko ............... H04N 19/36 375/240.1
2007/0133889 A1 * 6/2007 Horie ................... H04N 19/176 375/E7.199
2007/0201551 A1 * 8/2007 Wang ..................... H04N 19/46 375/240.1
2008/0211901 A1 * 9/2008 Civanlar ................ H04N 19/61 348/14.09
2009/0046941 A1 * 2/2009 Mietens ................. H04N 19/46 382/250
2010/0124284 A1 * 5/2010 Lee ...................... H04N 19/129 375/240.18
2015/0264404 A1 9/2015 Hannuksela
2015/0279325 A1 * 10/2015 Lu .......................... H04N 19/44 345/690
2020/0068198 A1 * 2/2020 Yang .................... H04N 19/593
2020/0404263 A1 * 12/2020 Hu ......................... H04N 19/86
2024/0056587 A1 2/2024 Lee et al.

FOREIGN PATENT DOCUMENTS

CN 101873484 A 10/2010
CN 102611890 A 7/2012
CN 103765899 A 4/2014
CN 106464891 A 2/2017
CN 109427032 A 3/2019
WO 2006/042612 A1 4/2006
WO 2013/128010 A2 9/2013
WO 2019/111004 6/2019
WO 2020/025957 2/2020

OTHER PUBLICATIONS

Office Action received for Chinese Patent Application No. 202180032544.4, mailed on Mar. 19, 2025, 26 pages (12 pages of English Translation and 14 pages of Original Document).
Office Action received for Japanese Patent Application No. 2022-561439, mailed on Feb. 4, 2025, 4 pages (2 pages of English Translation and 2 pages of Original Document).
International Search Report & Written Opinion for application No. PCT/GB2021/050892 mailed on Aug. 13, 2021.
M.Anto Bennet et al. "Performance, Analysis Of H.264/AVC Loseless Video Coding Using Hadamard Transform" International Journal of Computer Science & Engineering Technology (IJCSET), (8 pages).

* cited by examiner

TRANSFORMED COEFFICIENT ORDERING FOR ENTROPY CODING

TECHNICAL FIELD

The present disclosure relates generally to apparatus for encoding data, for example for encoding image or video data. Moreover, the present disclosure relates to methods for (namely, methods of) using aforesaid apparatus to encode data, for example for encoding image or video data. Moreover, the present disclosure relates to apparatus for decoding data, for example for decoding image or video data. Moreover, the present disclosure relates to methods for (namely, methods of) using aforesaid apparatus to decode data, for example for decoding encoded image or video data. Furthermore, the present disclosure relates to computer program products to execute the aforementioned methods.

BACKGROUND

MPEG-2, MPEG-4 and MPEG-5 video encoding standards are well known. In order to obtain efficient compression during encoding pursuant to these standards, macroblocks of pixels in an array of pixels spatially representing an image are processed using a discrete cosine transform (DCT) to provide DCT coefficients in a transformed macroblock of data.

The aforesaid MPEG encoders were developed at a time when computing resources were more modest, and processes image and video data very much in a serial manner, similar consideration pertain mutatis mutandis when decoding aforesaid encoded data. However, contemporary computing devices are able to process data in a more parallel manner by employing multiple processing cores. These contemporary computing devices have encouraged development of other types of encoding that are more amenable to execution on parallel computing devices.

These other types of encoding include, amongst others VC-6 and LCEVC standards that are described in various published patent applications that are hereby incorporated by reference. The LCEVC standard is, for example, described in the Draft Text of ISO/IEC DIS 23094-2 Low Complexity Enhancement Video Coding published at MPEG Meeting 129 in Brussels in January 2020. The VC-6 standard is described in the publication SMPTE ST 2117-1 (21 Jul. 2020). Both of these standard specifications are also incorporated by reference herein.

In particular, the VC-6 standard is described in patent applications:

EP12756254.4, EP12756257.7, EP12756258.5, EP12759220.2, EP12818920.6, EP12759221, EP12799276.6, EP13723460.5, EP13722424.2, EP13724216.0, PCT/EP2018/0756033, EP17386046.1, EP18386002.2, PCT/GB2018/053546, PCT/GB2018/053555, PCT/GB2018/053547, PCT/GB2018/053554, PCT/GB2018/053548.

In particular, LCEVC type is described in patent applications:

EP12756254.4, EP12756257.7, EP 12756258.5, EP12759220.2, EP12818920.6, EP12799276.6, EP13708525.4, EP13723460.5, EP13722424.2, EP13724216.0, EP14722769.8, EP16804893.2, EP16718438.1, EP17783955.2, EP17783956.0, EP17783957.8, PCT/EP2018/075603, PCT/GB2018/053548,

EP 18199014.4, PCT/GB2019/053068, PCT/GB2019/053066, PCT/GB2019/053067, PCT/GB2019/053069, PCT/GB2020/050695, PCT/GB2019/051974, PCT/GB2019/052152, PCT/GB2019/052151, PCT/GB2019/052154, PCT/GB2019/052166, PCT/GB2019/052867, PCT/GB2019/053070, PCT/GB2019/053551, PCT/GB2019/053547, PCT/GB2020/050492, PCT/GB2020/050574, PCT/GB2020/050693, PCT/GB2020/050692, PCT/GB2020/050725, and PCT/GB2020/050695.

LCEVC and VC-6 do not employ prediction and the DCT as implemented in various known MPEG, H.264 and H.265 standards. Beneficially, VC-6 and/or LCEVC may employ such known standards to implement a base layer of encoding, to ensure backward compatibility with legacy systems, and then add at least one enhancement layer, for example implemented in software, that provides enhancements to the base layer so as to have scalable quality to decoded data, thereby providing a balance between bit-rate and quality of video rendition in decoders.

In particular, in LCEVC and VC-6, the base layer of encoding is performed with respect to a down-sampled original input image or video data. A difference between a decoded version of the base encoded data and the original input is computed on a frame-by-frame basis and this difference forms the basis for residual data that may be added to the decoded version of the base encoded data. Both LCEVC and VC-6 provide multiple levels of spatial scalability, where residual data may be computed for each level to efficiently encode different levels of features at different spatial resolutions. This differs from comparative MPEG, H.264 and H.265 standards where predictions are made for a macroblock using neighbouring blocks within a frame or other frames in a video sequence. It allows highly parallelisable processing that is not possible with H.264 and H.265 (e.g., that is not possible due to the inherent spatial and temporal correlations between blocks that are introduced via the predictions).

An ongoing objective technical problem in video coding, which is addressed by the present disclosure, is how to encode data in a more efficient manner. For example, it is desired to develop methods in which at least residual data, as generated by the VC-6 and LCEVC standards, are capable of being encoded in a more efficient manner.

SUMMARY

The present disclosure seeks to provide an improved apparatus for encoding at least residual data in a more efficient and effective manner. Moreover, the present disclosure seeks to provide an improved method for encoding the residual data in a more efficient and effective manner. Moreover, the present disclosure seeks to provide an improved apparatus for decoding at least the residual data in a more efficient and effective manner. Moreover, the present disclosure seeks to provide an improved method for decoding at least the residual data in a more efficient and effective manner.

In a first aspect, the present disclosure provides a method for encoding input data in an encoder to generate encoded output data, wherein the method includes: instructing the conversion of the input data into base-layer reconstruction data using a down-sampled version of the input data; and generating enhancement-layer data that provides instructions for enhancing the base-layer reconstruction data, wherein the enhancement-layer data comprises residual data representing a difference between a reconstruction generated from the base-layer reconstruction data and data derived from the input data, wherein the residual data are subjected to at least one transform and at least one data compression method to generate the encoded output data, characterized in that the method includes: arranging for the at least one transform to include a Hadamard transform to convert the residual data to corresponding transform coefficients, wherein different output elements of the Hadamard transform are arranged as different surfaces to be encoded, and selecting an output order for the transform coefficients in the surfaces to provide a sequence of transform coefficients for the at least one data compression method to generate the encoded output data, wherein the output order is selected as one of at least a tile raster order and a n-by-n block "Z"-order.

The invention is of advantage in that the readout of transformed (Hadamard) coefficients enables improved data compression performance when generating the encoded output data.

Optionally, in the method, transformed coefficients are generated based on a predefined coding unit size (e.g., either 2 by 2 or 4 by 4 blocks of residuals) and the tiles for the tile raster order comprise sets of transformed coefficients that are larger than the coding unit sizes. The tile raster order may include encoding tiles of transformed coefficients wherein the tiles are read-out in a raster manner.

Optionally, in the method, the tile manner includes encoding tiles have a size of 8×8 elements, 16×16 elements, 32×32 elements.

Optionally, in the method, the at least one data compression method includes run-length encoding (RLE) followed by Huffman encoding.

Optionally, the n-by-n block "Z"-order includes one or more n-by-n "Z"-order readouts from top-left coefficient to top-right coefficient to bottom-left coefficient to bottom-right coefficient in a given group of coefficients, wherein the n-by-n "Z"-order readouts are repeated in a recursive n-by-n "Z"-order across different groups of transformed coefficients. For example, the "Z"-order may include one or more 2×2 "Z"-order readouts from top-left coefficient to top-right coefficient to bottom-left coefficient to bottom-right coefficient in a given group of coefficients, wherein the 2×2 "Z"-order readouts are repeated in a "Z"-order when the matrix or surface of Hadamard-transformed coefficients includes multiples of 2×2 groups of coefficients.

Optionally, the method is implemented to be compatible with VC-6 or LCEVC standards.

According to a second aspect, there is provided an encoder that, when in operation, encodes input data to generate corresponding encoded output data, wherein the encoder instructs the conversion of the input data into base-layer reconstruction data using a down-sampled version of the input data, wherein the encoder generates enhancement-layer data that provides instructions for enhancing the down-sampled version of the input data, wherein the residual data represents a difference between a reconstruction generated from the base-layer reconstruction data and data derived from the input data, wherein the residual data are subjected in the encoder to at least one transform and at least one data compression transform to generate the encoded output data, characterized in that the at least one transform includes a Hadamard transform to convert the residual data to corresponding Hadamard transform coefficients, wherein different output elements of the Hadamard transform are arranged as different surfaces to be encoded, wherein the encoder is configured to select an output order for the transform coefficients in the surfaces to provide a sequence of transform coefficients for the at least one data compression method to generate the encoded output data, wherein the output order is selected as one of at least tile raster order and a n-by-n block "Z"-order.

Optionally, in the encoder, the at least one data compression method includes run-length encoding (RLE) followed by Huffman encoding.

Optionally, in the encoder, the tile raster order includes encoding tiles of transformed coefficients, wherein the tiles are read-out in a raster manner.

Optionally, in the encoder, tile raster order includes encoding tiles having a size in a range of 8×8 elements to 64×64 elements, wherein transform coefficients are selected in raster order within each tile. For example, tiles may have a size of 8×8 elements, 16×16 elements, or 32×32 elements.

Optionally, in the encoder, the n-by-n block "Z"-order includes one or more n-by-n "Z"-order readouts from top-left coefficient to top-right coefficient to bottom-left coefficient to bottom-right coefficient in a given group of coefficients, wherein the n-by-n "Z"-order readouts are repeated in a recursive n-by-n "Z"-order across different groups of transformed coefficients. For example, the "Z"-order may include one or more 2×2 "Z"-order readouts from top-left coefficient to top-right coefficient to bottom-left coefficient to bottom-right coefficient in a given group of coefficients, wherein the 2×2 "Z"-order readouts are repeated in a "Z"-order when the matrix or surface of Hadamard-transformed coefficients includes multiples of 2×2 groups of coefficients.

Optionally, the encoder is implemented to be compatible with VC-6 or LCEVC standards.

According to a third aspect, there is provided a computer program product comprising a non-transitory computer-readable storage medium having computer-readable instructions stored thereon, the computer-readable instructions being executable by a computerized device comprising processing hardware to execute a method of the aforesaid second aspect.

According to a fourth aspect, there is provided a method for decoding encoded data in a decoder to generate decoded output data, wherein the method includes: (i) receiving encoded data at the decoder; (ii) applying at least one inverse transform to convert the received encoded data into enhancement-layer data that provides instructions for enhancing a base-layer reconstruction derived from a down-sampled version of the input data, wherein the enhancement-layer data comprises residual data to provide its enhancement, wherein the residual data are subjected to at least one transform and at least one data compression method to generate the received encoded data, characterized in that the method further includes: (iii) decompressing the received encoded data according to the at least one data compression method to generate intermediate decoded data; and (iv) arranging for the at least one inverse transform to include an inverse Hadamard transform to convert transform coefficients derived from the intermediate decoded data into the residual data, wherein the transform coefficients are decoded by being read in a tile raster manner or a n-by-n block "Z"-order.

According to a fifth aspect, there is provided a computer program product comprising a non-transitory computer-readable storage medium having computer-readable instructions stored thereon, the computer-readable instructions being executable by a computerized device comprising processing hardware to execute a method of the fourth aspect.

According to a sixth aspect, there is provided a decoder for decoding encoded data to generate decoded output data, wherein the decoder includes: (i) an input for receiving encoded data; (ii) a data processing arrangement for applying at least one inverse transform to convert the received encoded data into enhancement-layer data that provides instructions for enhancing a base-layer reconstruction derived from a down-sampled version of the input data, wherein the enhancement-layer data comprises residual data to provide its enhancement, wherein the residual data are subjected to at least one transform and at least one data compression method to generate the encoded data, characterized in that the decoder further includes: (iii) a decompression arrangement for decompressing the received encoded data using according to the at least one data compression method to generate intermediate decoded data; and (iv) an inverse transformation arrangement to apply the at least one inverse transform as an inverse Hadamard transform to convert transform coefficients derived from the intermediate decoded data into the residual data, wherein the transform coefficients are decoded by being read in a tile raster manner or a n-by-n block "Z"-order.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
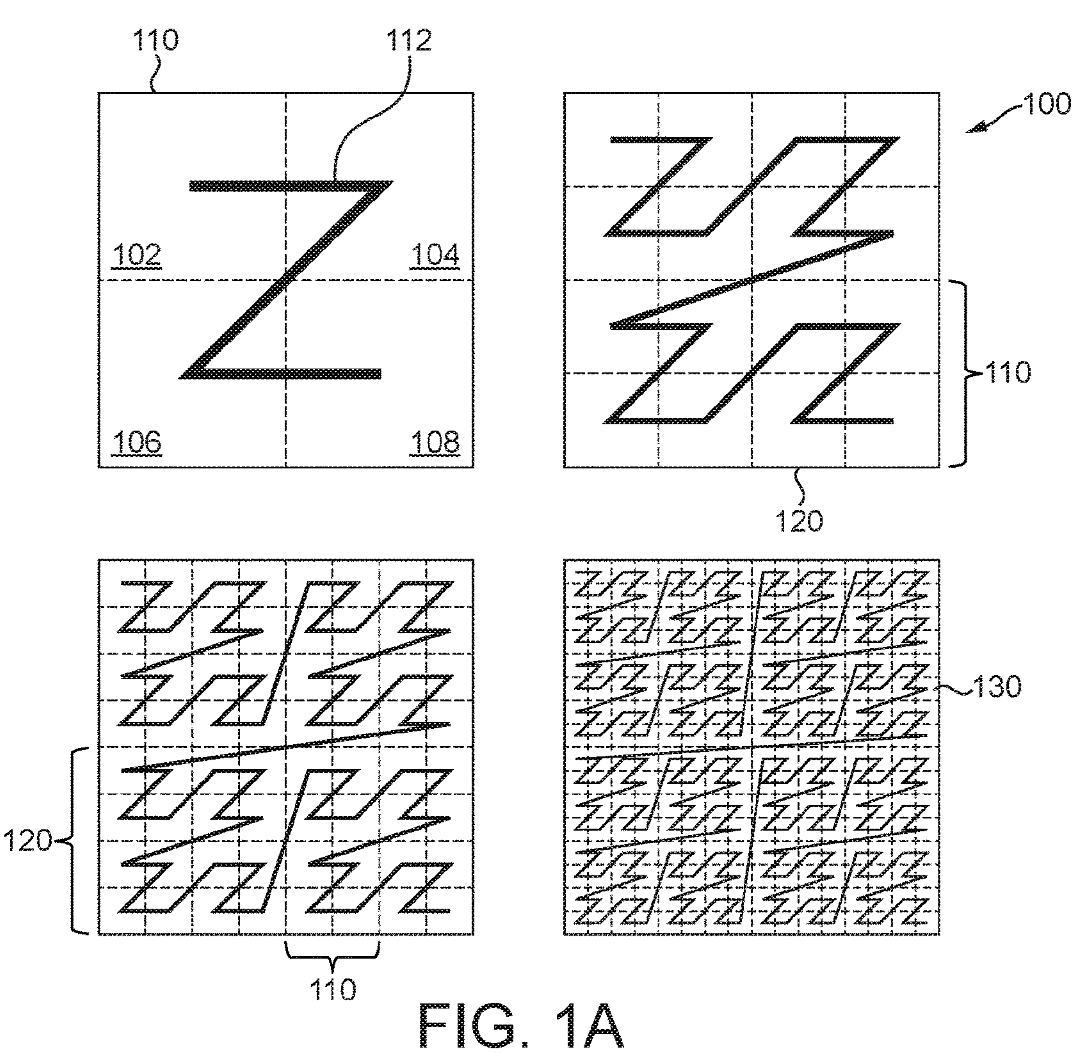
FIG. 1A is a schematic illustration of different scales of a Z-order manner of reading out coefficients from a Hadamard transform.

In the accompanying diagrams, an underlined number is employed to represent an item over which the underlined number is positioned or an item to which the underlined number is adjacent. A non-underlined number relates to an item identified by a line linking the non-underlined number to the item.

DETAILED DESCRIPTION OF EMBODIMENTS

In the following detailed description, illustrative embodiments of the present disclosure and ways in which they can be implemented are elucidated. Although some modes of carrying out the present disclosure is described, those skilled in the art would recognize that other embodiments for carrying out or practicing the present disclosure are also possible.

It is known via enhancement coding standards such as LCEVC and VC-6 that encoding input data in an encoder to generate encoded output data may comprise instructing the conversion of the input data into base-layer reconstruction data using a down-sampled version of the input data and generating enhancement-layer data that provides instructions for enhancing the base-layer reconstruction data. For example, the input data may be downsampled and supplied to a base codec for encoding and subsequent decoding. The encoded base layer forms an encoding of the base layer reconstruction data that is transmitted to the decoder. The enhancement-layer data comprises residual data representing a difference between a reconstruction generated from the base-layer reconstruction data (i.e., the subsequently decoded, encoded base layer) and data derived from the input data. There may be multiple layers of residual data (e.g., LCEVC has two layers) representing different spatial resolutions. Each stream of residual data are subjected to at least one transform and at least one data compression method to generate encoded output data, i.e. an encoded set of residual streams. Quantisation may also be performed following transformation. The encoded output data may comprise the encoded base layer (e.g., as part of a multiplexed combined base and enhancement stream) or may be transmitted separated. An encoder may be suitably configured to perform this method.

Similarly, there may also be a corresponding method for decoding encoded data in a decoder to generate decoded output data. This method includes receiving encoded data at the decoder and applying at least one inverse transform to convert the received encoded data into enhancement-layer data. The inverse transform may transform a set of transformed coefficients back into residual data. Dequantisation may also be performed following the inverse transformation. The enhancement-layer data comprises the previously described residual data that was generated at the encoder. The decoder may receive the encoded base layer and instruct decoding of this with a base layer decoder (e.g., corresponding to the base layer encoder used by the previously described encoder). This may result in base-layer reconstruction data at the decoder, which may be enhanced with the residual data. In one case, a reconstruction generated with the base-layer reconstruction data is upsampled before applying at least one layer of residual data. A decoder may be suitably configured to perform this method.

More details may be found in published materials relating to the LCEVC and VC-6 standard.

Walsh-Hadamard transforms are simple but effective ways of compressing data. They have a significant advantage in that the basic transform requires no multiplications, only sums and differences. The discrete Walsh-Hadamard transform (DWHT) is obtained from a simple rearrangement of the discrete Hadamard matrix. The Hadamard matrix is a matrix with such a property. Higher order matrices can be found by iteratively applying the following operation:

$$H_{2N} = \begin{bmatrix} H_N & H_N \\ H_N & -H_N \end{bmatrix} \quad \text{Eq. 1}$$

For example:

$$H_1 = 1; H_2 = \begin{bmatrix} 1 & 1 \\ 1 & -1 \end{bmatrix}; H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{Eq. 2}$$

The DWHT is simply obtained from the corresponding Hadamard matrix by normalization and rearranging the rows in sequency order (i.e. in terms of the number of sign changes). Therefore, the four-point DWHT is given by:

$$H_4 = 1/4\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{Eq. 3}$$

Figure 1B:
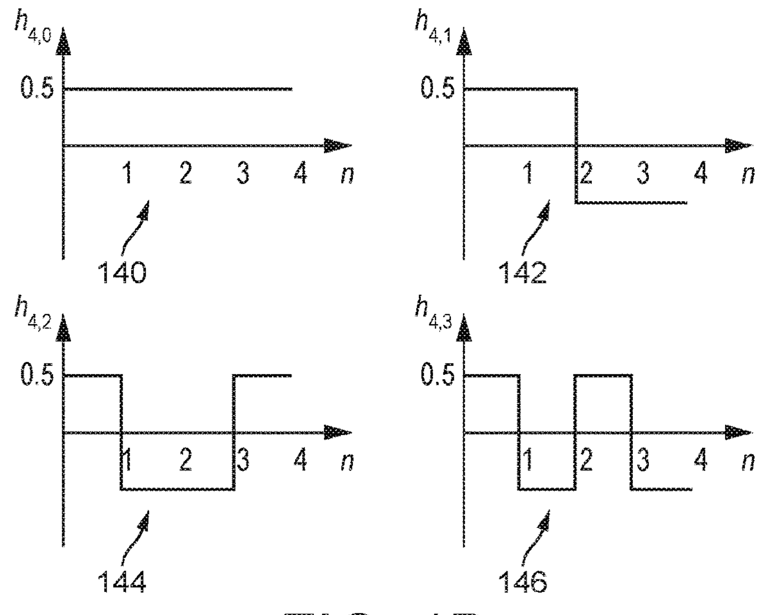
FIG. 1B is an illustration of a basis for a Walsh-Hadamard transform (DWHT)

Basis functions for the 1-D DWHT 140, 142, 144, 146 are depicted in FIG. 1B. In certain cases, the normalizing factor (¼ in equation 3) may be omitted such that the transform matrix resembles the Hadamard matrix of equation 2. For example, this may be possible if the normalization is incorporated into other functions such as quantization. Within LCEVC and VC-6, a transformation based on the DWHT or Hadamard transform is referred to as a directional decomposition (DD) transform. It may be applied as a 4 by 4 transformation matrix or a larger 16 by 16 transformation matrix, the latter case being referred to as a directional decomposition squared (DDS) transform, as it is equivalent to applying the DD transform twice. Directional decompositions have energy compaction and decorrelation properties, as the rows of the Hadamard matrix are orthogonal and the energy of the signal is represented via the "average" coefficient associated with the first row of the Hadamard matrix, the other coefficients representing differences in different directions. For many original image blocks, signal energy tends to be distributed fairly uniformly across the block. After transformation, the data has been decorrelated horizontally and vertically and for many blocks one dominant coefficient, the average coefficient, contains most of the signal energy.

Hadamard functions are applied to data arrays of residual elements generated during VC-6 and LCEVC encoding operations to provide corresponding Hadamard-transformed elements, referred to herein as transformed coefficients. For example, each row of the 4 by 4 Hadamard matrix (the DD transform) may be labelled as one of A, H, V and D, corresponding respectively to Average, Horizontal Differences, Vertical Differences and Diagonal Differences within a coding unit (typically a 2×2 or 4×4 block of residuals). As described, for example in the LCEVC standard, a 2×2 coding unit containing residuals is flattened into a 4×1 vector, that is then transformed using the Hadamard matrix to generate a 4×1 vector with [A, H, V, D] coefficient terms. Each one of these coefficients may be grouped with other similar coefficients, such that the transform generates four "surfaces", i.e. frames or matrices of transformed coefficient values of relating to particular one of A, H, V and D. For example, there may be an A surface, an H surface, a V surface and a D surface. For a 16 by 16 DDS transform there may be 16 surfaces. The Hadamard transformation may be performed in parallel on coding units and is then followed by entropy encoding, which comprises run-length encoding followed by Huffman encoding.

In comparative LCEVC standard implementations, transformed coefficients for each surface are read out for RLE in a major row raster order across the surface. An example of this ordering is shown in FIG. 1D, whereby transformed coefficient values 160 are read out along each row of the surface in turn (e.g., from left to right along each row as shown by line 162).

In the present examples, the inventors have realised that selecting the ordering of transformed coefficients prior to RLE can influence the compression efficiency. They have realised that the residual data generated as part of enhancement encoding (e.g., as performed in LCEVC or VC-6) will often exhibit spatial correlation based on original spatial correlation within the original frame of video. As the enhancement coding described herein generates enhancement data based on a comparison of original data and an upsampled reconstruction from a lower spatial resolution it differs in its properties from residual data generated in comparative video codecs such as H.264 and H.265, where in the latter case residual data is generated based on either local spatial prediction (e.g., via neighbouring blocks) or motion vector mediated temporal prediction (e.g., via other frames). Hence, the residual data within standards such as LCEVC and VC-6 has different properties, such as spatial correlation, that is not expected from comparative residual processing approaches. The inventors have realised that this spatial correlation may extend across multiple coding units and so transformed coefficients within surfaces may also show spatial correlation. For example, a horizontal line may extend across multiple coding units. The present examples thus allow the selection of a readout order for transformed coefficients that allows for beneficial compression during subsequent RLE and/or Huffman encoding. It has further been found that an improved readout order may depend on the content being encoded. As such, a content-dependent readout order may be selected during encoding and communicated to a decoder to allow corresponding readout following decompression. These benefits are found to occur independent of any quantisation that is performed (e.g., before or after readout).

In certain examples described herein two alternatives to a major row raster readout order are presented. These include a tile raster order and a n-by-n block "Z" order. The benefit of each order may vary by one or more of content type and desired bitrate, such that one of the three orders may be selected during encoding to provide the best compression and communicated to the decoder as configuration data for decoding.

FIG. 1A shows an example of a "Z" readout order performed on a surface of transformed coefficients. The upper left corner of FIG. 1A shows a "Z"-order being applied to 2 by 2 block 110 of transformed coefficients 102, 104, 106, 108 in a surface. The remaining portions of FIG. 1A show how this "Z"-order may be applied recursively. For example, the upper right corner shows a "Z"-order being applied across a block of 16 transformed coefficients 120 formed from four 2 by 2 blocks 110. The lower left corner then shows a "Z"-order applied to 2 by 2 group of blocks 120 and this pattern is again repeated for the coefficients 130 in the lower right corner.

In more detail, referring to FIG. 1A top-left, a 2×2 block of transformed coefficients from a surface is read from top-left coefficient to top-right coefficient to bottom-left coefficient to bottom right coefficient, namely in a "Z" order. As shown in FIG. 1A top-right, a 4×4 group of transformed coefficients is read in four groups of 2×2 transform coefficients, wherein reading is also implemented in a "Z" order for the four groups as illustrated. Such a "Z" order of readout is also illustrated in FIG. 1A for a 16×16 group of transformed coefficients and also for a 32×32 group of transformed coefficients. When the transformed coefficients have been read out in the order indicated in FIG. 1A, a corresponding 1-dimensional (1-D) sequence of transformed coefficients are generated that are susceptible to being encoded using run-length encoding, Huffman coding or other entropy encoding approaches to generate compressed data for communicating to a decoder. Quantisation may also be performed before or after readout. Beneficially, a combination of run-length encoding followed by Huffman coding is employed when encoding data for VC-6 and LCEVC.

In certain cases, the "Z"-order shown in FIG. 1A was shown to provide improved encoding as compared to a major row raster order. For certain content types, a tile raster order with tiles of a configurable size was also found to provide compression improvements. In certain cases, readout of the transformed coefficients in a tiled manner was found to provide even better compression results than the aforesaid "Z" readout order. In the tile raster order case, coefficients are read in a raster order within defined tiles and then the readout transformed coefficients are subsequently compressed using run-length encoding, Huffman encoding or a combination of run-length encoding and Huffman encoding (with optional quantisation as described above). It has been found that tiles with a size in a range of 8×8 element arrays to 64×64 element arrays, for example 8×8 element arrays, 16×16 element arrays or 32×32 element arrays provide beneficial results. It will be appreciated that rectangular format element arrays can be used, instead of the aforementioned square element arrays.

Figure 1C:
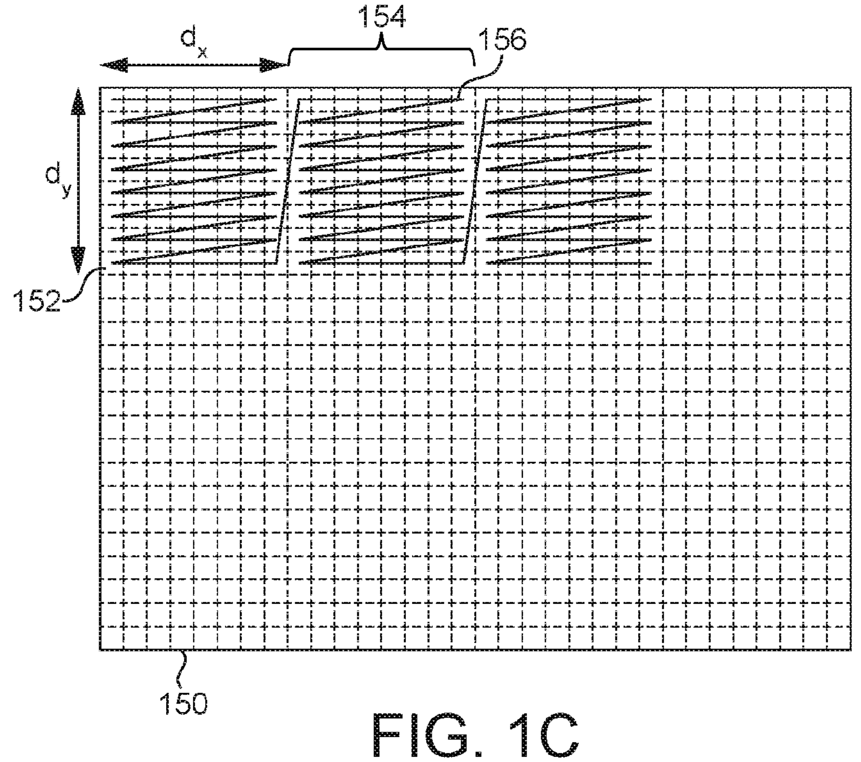
FIG. 1C is a schematic illustration of part of a tile raster order readout.
Figure 1D:
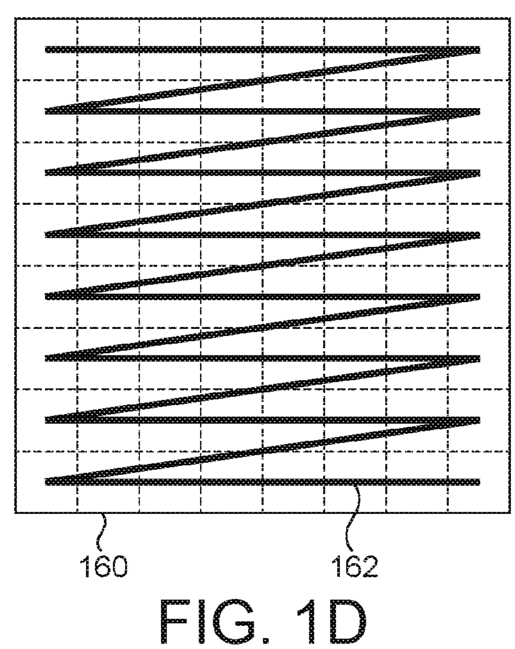
FIG. 1D is a schematic illustration of a comparative raster readout.

FIG. 1C shows an example of a tile raster order being applied to a surface 150 of transformed coefficients 152. An example tile 154 is shown with a size of $d_x$ coefficients by $d_y$ coefficients. In certain cases, for square tiles, $d_x=d_y=d$, where d may be set as one of 8, 16, 32 or 64. As is shown partially for the first three tiles, a readout order moves in a raster order within each tile, e.g. along each row of a tile as shown before moving to a next tile. The tile raster order may be continued across the whole surface 150 of transformed coefficients 152 to generate the 1D sequence. It should be noted that these tiles are defined independently of the original coding unit sizes that are used as the basis for the transformation (where the transformation may be applied in parallel to each coding unit to generate the surface).

In summary, in comparative standardised processing practice to a simple raster readout of data from a Hadamard transform may be employed to generate a sequence of coefficients for compression using, for example, run length encoding (RLE). However, it has been found, quite unexpectedly, that employing one or more of a "Z" order or a tiled manner of readout of Hadamard coefficients is even more beneficial to provide improved compression performance. Such an increase in compression performance is believed to arise on account of spatial correlation within a given image frame or video frame. Such improvement in compression performance is illustrated in FIGS. 2 to 21.

"Z"-ordering essentially encodes the coefficients in a recursive Z-shaped pattern, first encoding four coefficients in a Z-pattern, then encoding 4 Z-patterns in a Z-pattern; as is illustrated in FIG. 1A. This process repeats at larger and larger scales until an entire image, for example, is encoded. However, it will be appreciated that boundary conditions complicate the Z-order algorithm slightly when surface lengths in a given image are not powers of two, but various effective implementations of the Z-order read out are nevertheless feasible.

Experimentally, when encoding different types of image and video content, embodiments of the present disclosure are capable of providing improved data compression performance, for example enhancement in an order of 40% in achievable compression compared to raster readout of coefficients. However, for certain types of image and video content, enhancements in achievable compression are considerably less than 40% as shown in certain of FIGS. 2 to 21.

Figure 2:
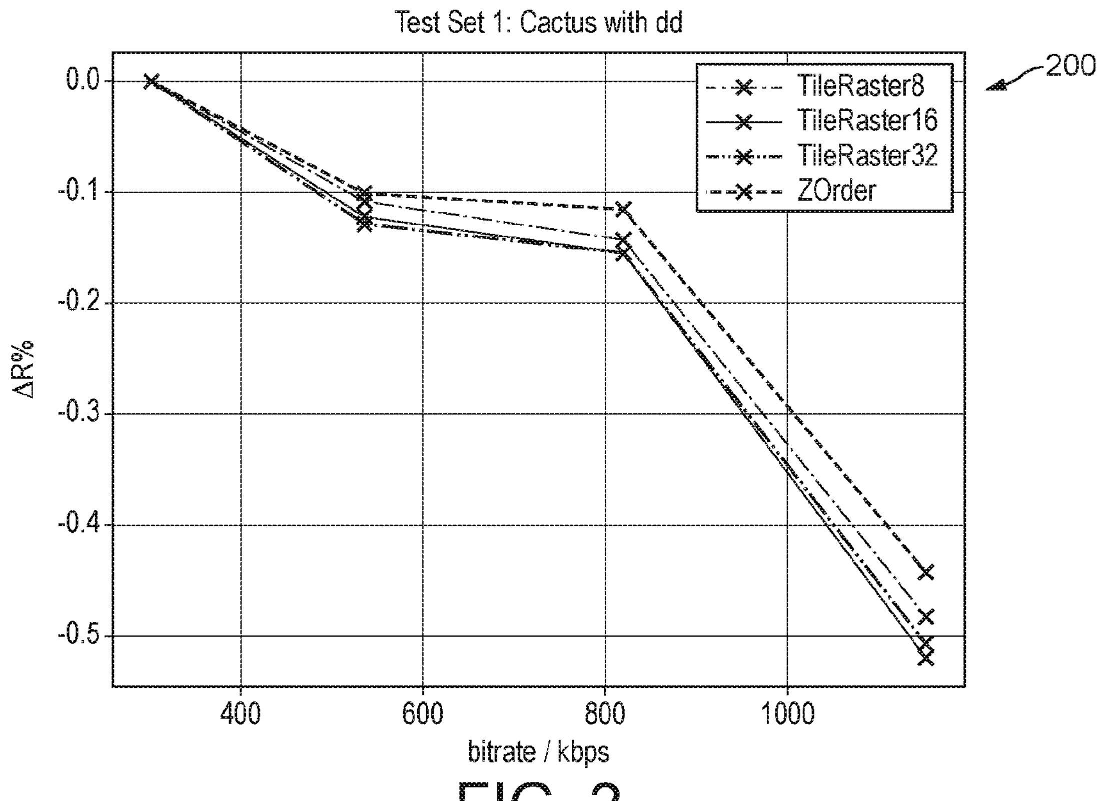
FIGS. 2 to 21 are graphical illustrations of performance benefits derived from employing the tile and Z-order manner of reading out coefficients from a Hadamard transform when applied to various types of image or video content.
Figure 3:
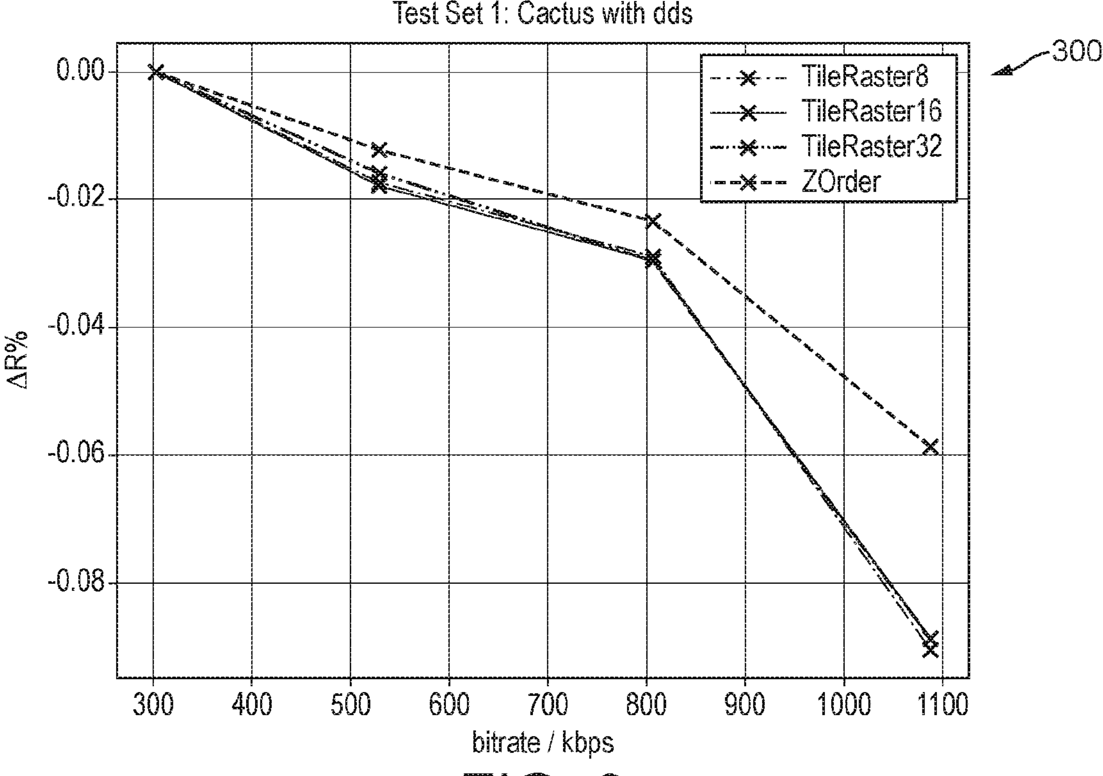
Figure 4:
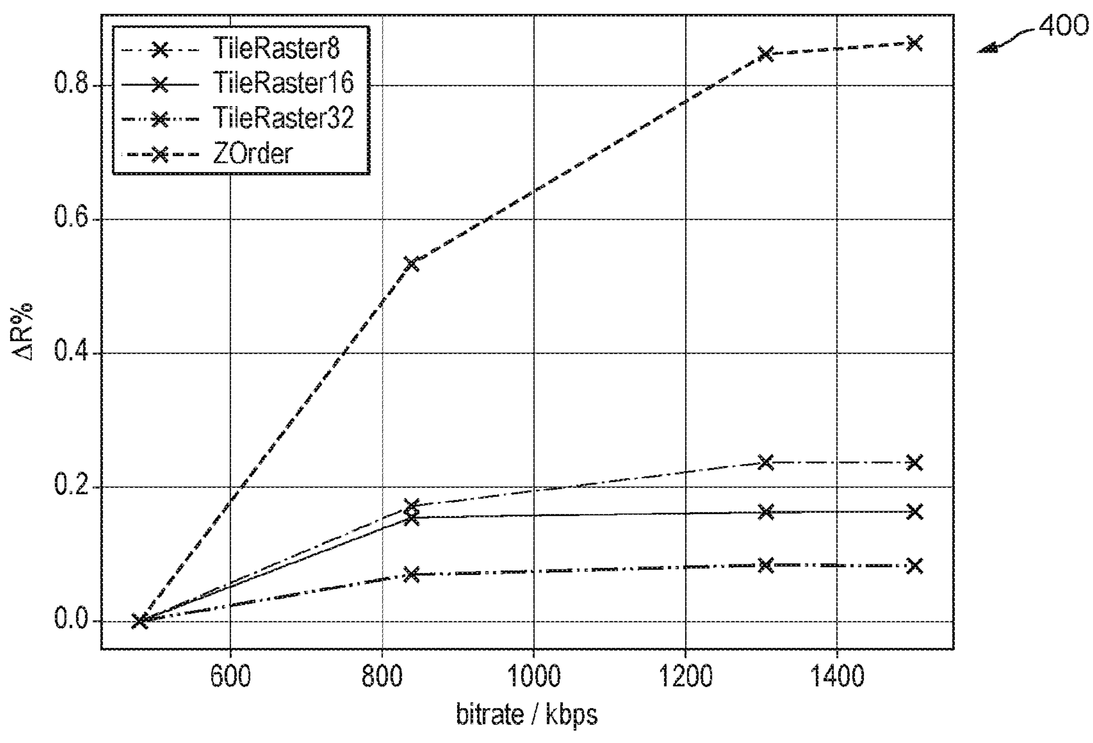
Figure 5:
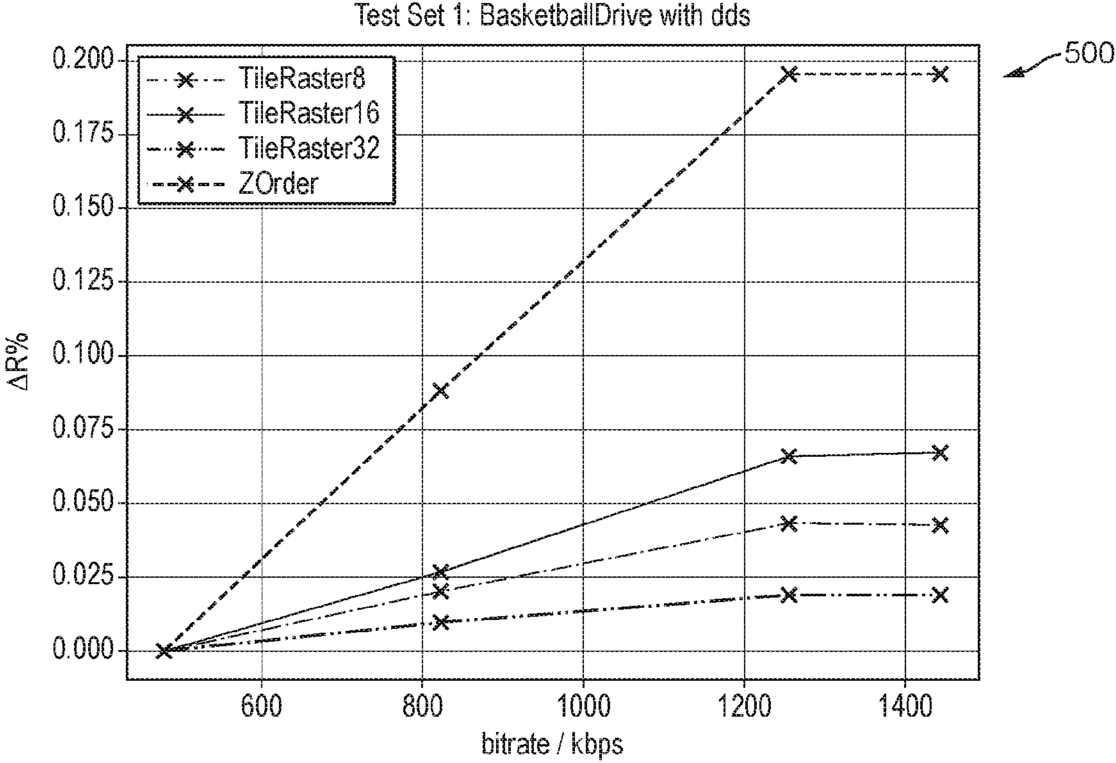
Figure 14:
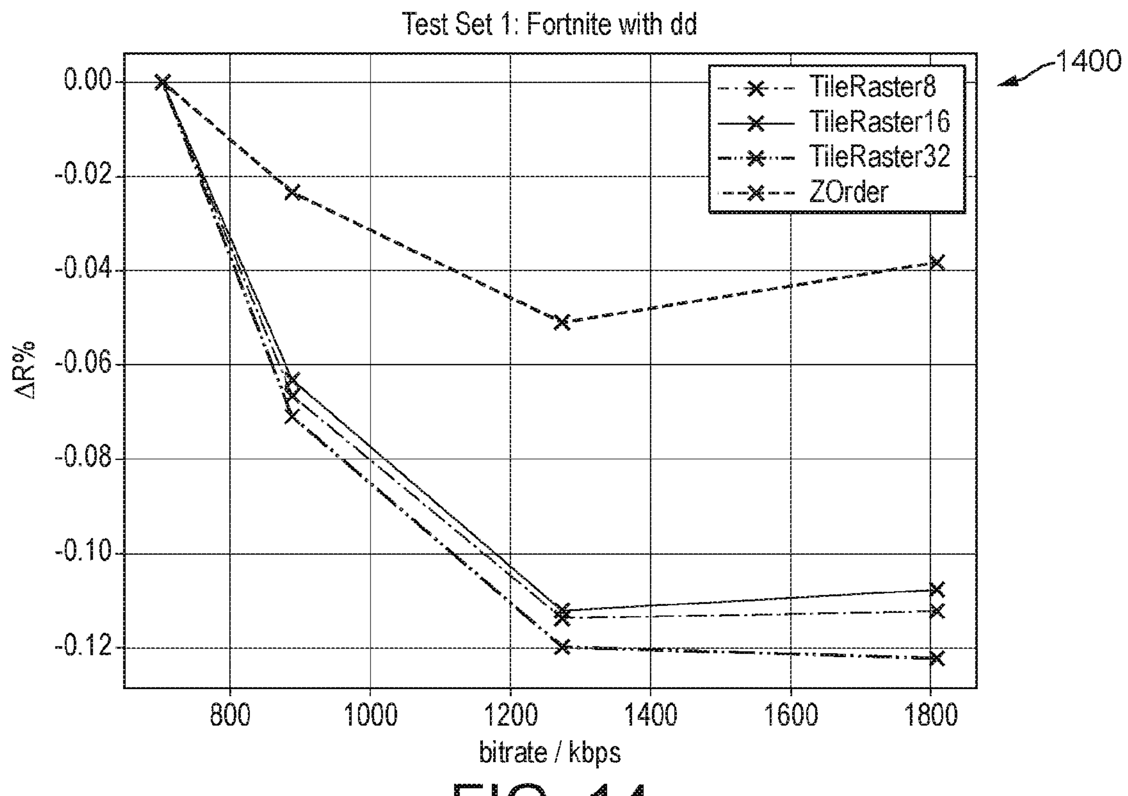
Figure 15:
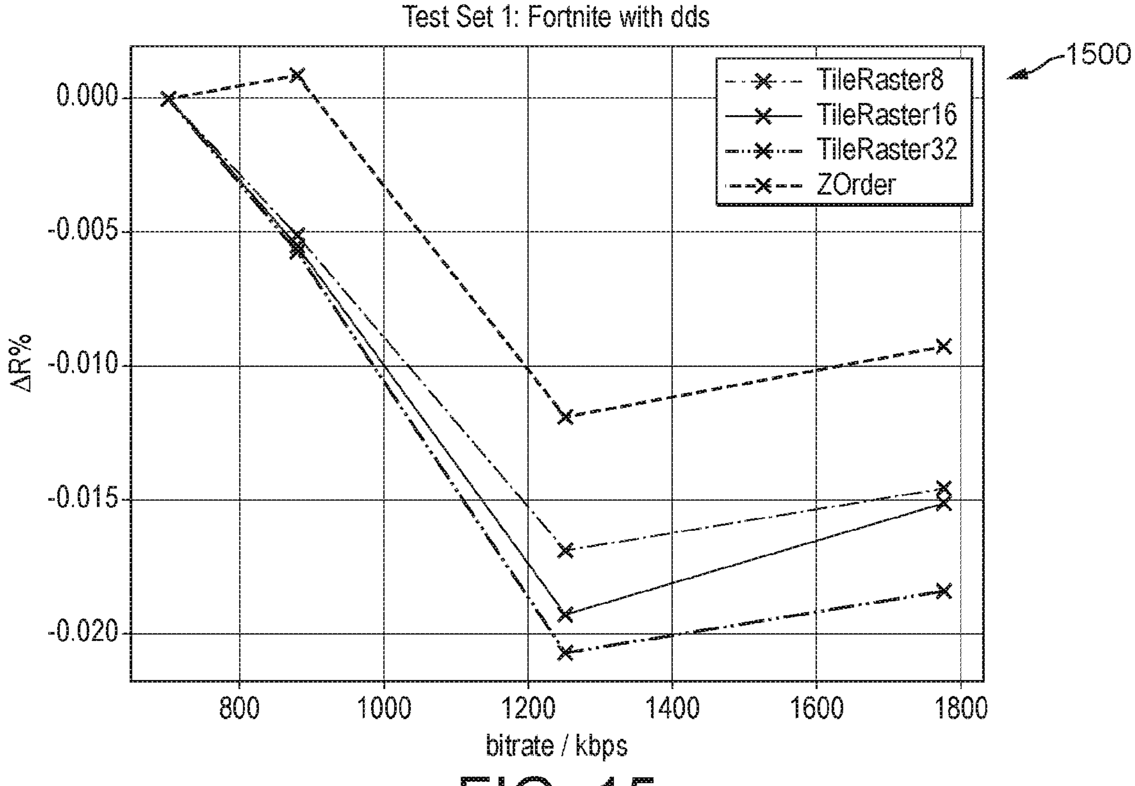
Figure 16:
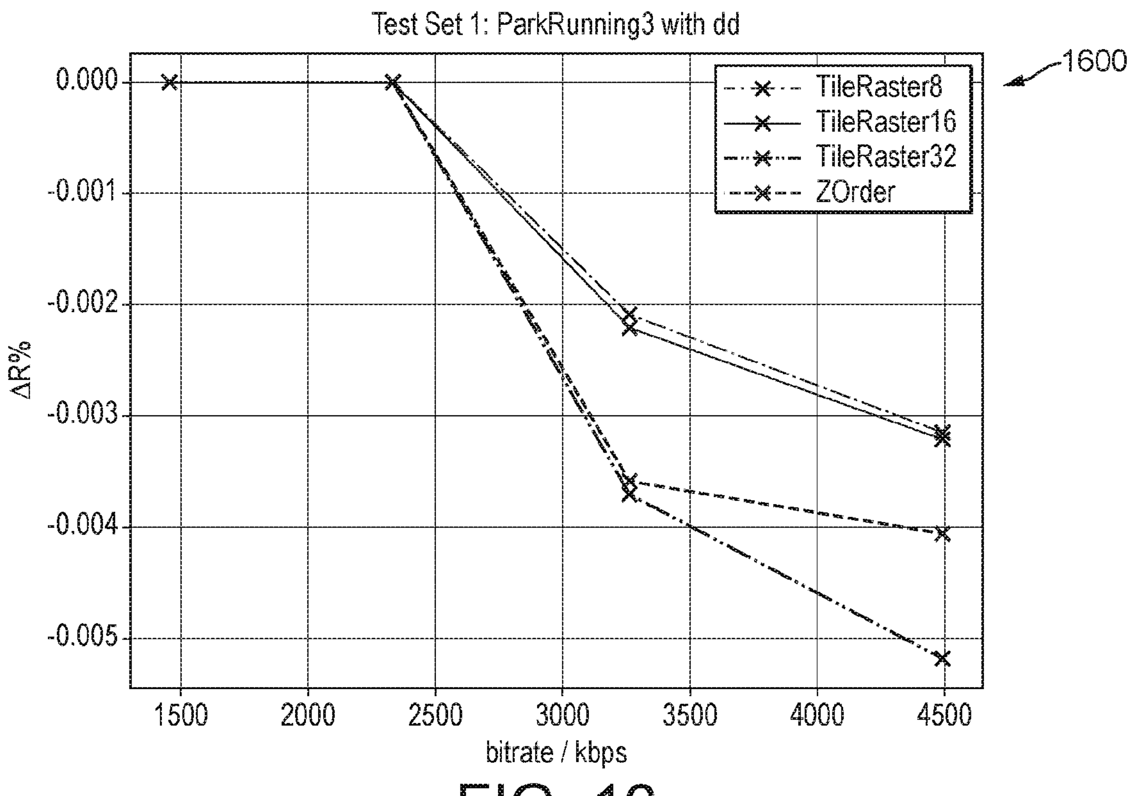
Figure 17:
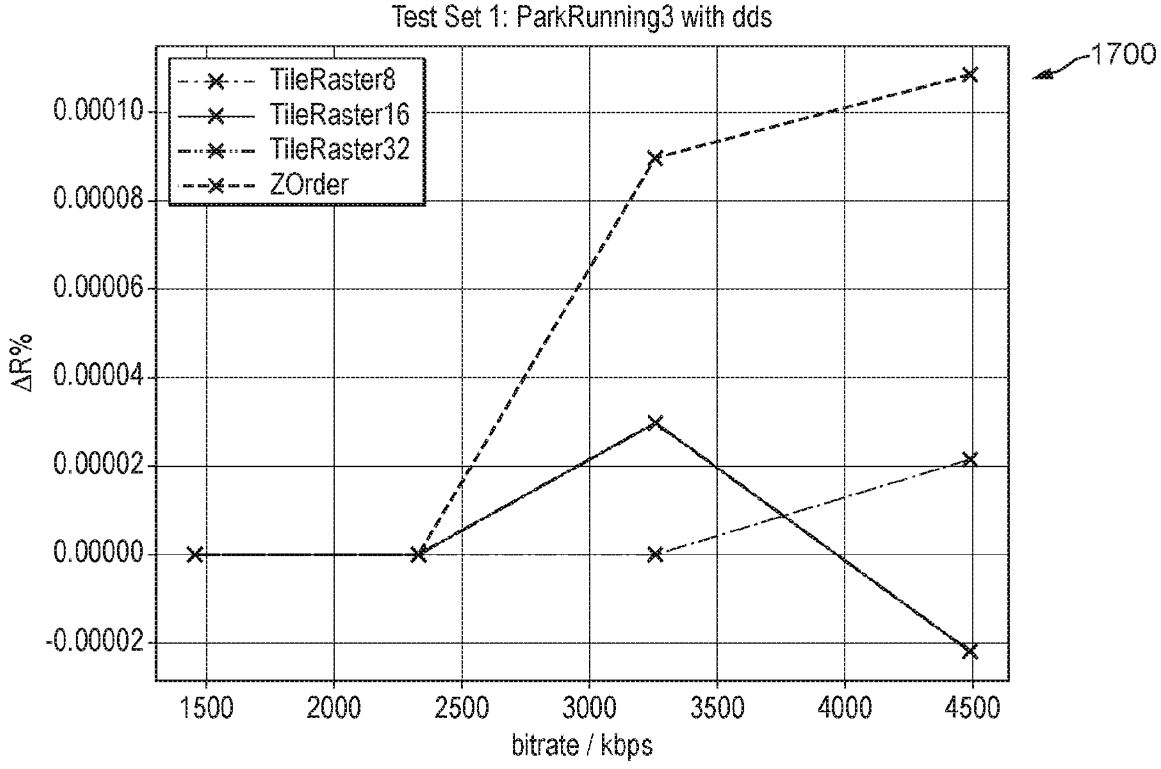

FIGS. 2 and 3 show results 200 and 300 for respective encoding based on a DD transform (4 by 4 Hadamard transform) and a DDS transform (16 by 16 Hadamard transform). The y-axis sets out a relative change ΔR in percentage terms as compared to an original major-row-raster order, e.g.:

$$\Delta R=\left(\frac{R_{new}}{R_{orig}}-1\right)*100\%$$

where $R_{new}$ is the bitrate obtained from the new proposed ordering methods and $R_{orig}$ is the original major-row-raster order. Values of ΔR<0% represent an improvement over the original order and values of ΔR>0% represent a decrease in compression efficiency. Tests were performed using a set number of frames (e.g., 100) with fixed quantisation parameters. FIGS. 2 and 3 show that the proposed orders offer an improvement as the encoding bitrate increases. FIGS. 2 and 3 show results for a first test video "cactus". FIGS. 4 and 5 show results 400 and 500 for a second test video "BasketballDrive", FIGS. 14 and 15 show results 1400 and 1500 for a third test video "Fornite", and FIGS. 16 and 17 show results 1600 and 1700 for a fourth test video "ParkRunning3", similarly for DD and DDS transforms.

Figure 6:
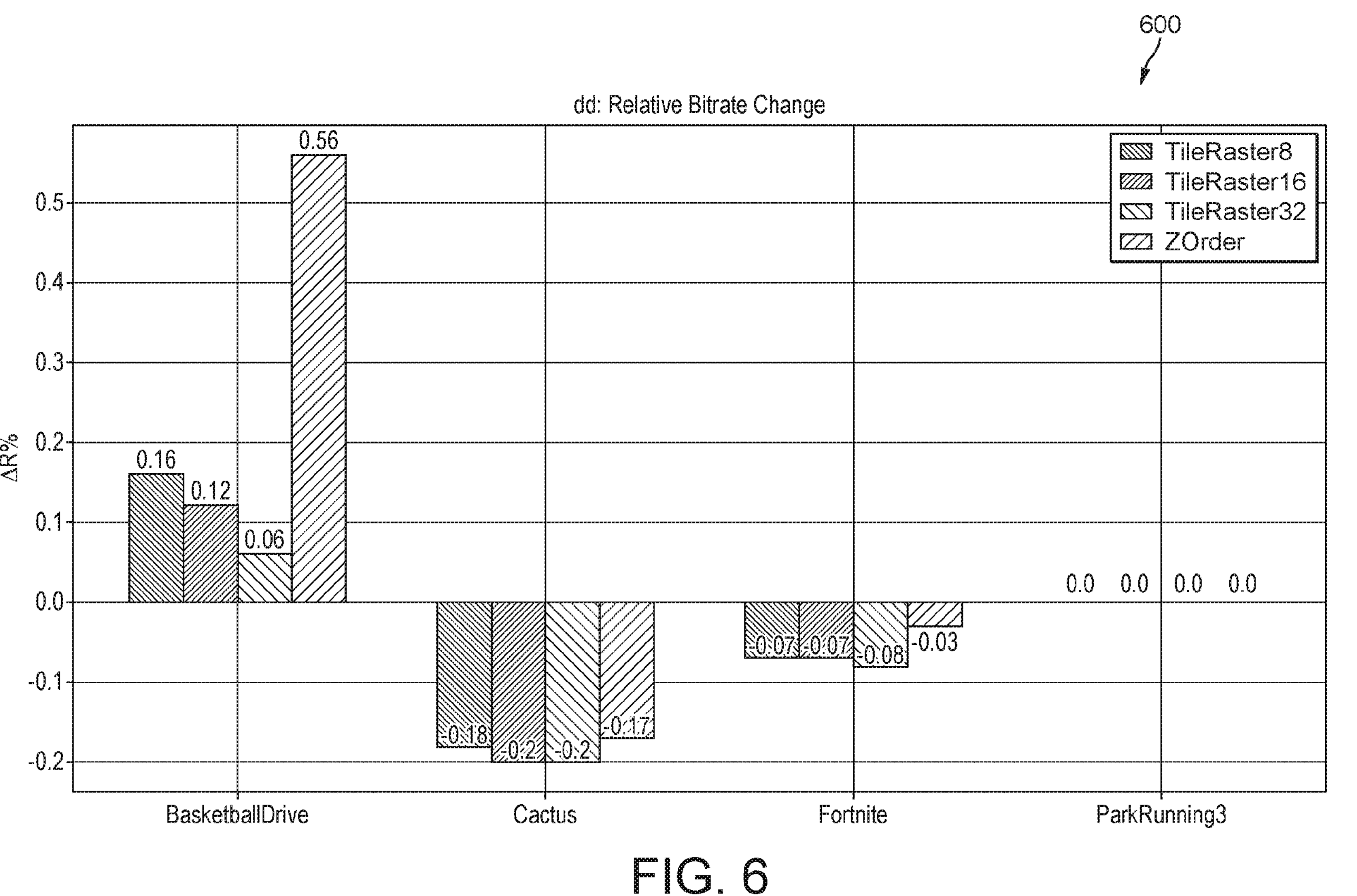
Figure 7:
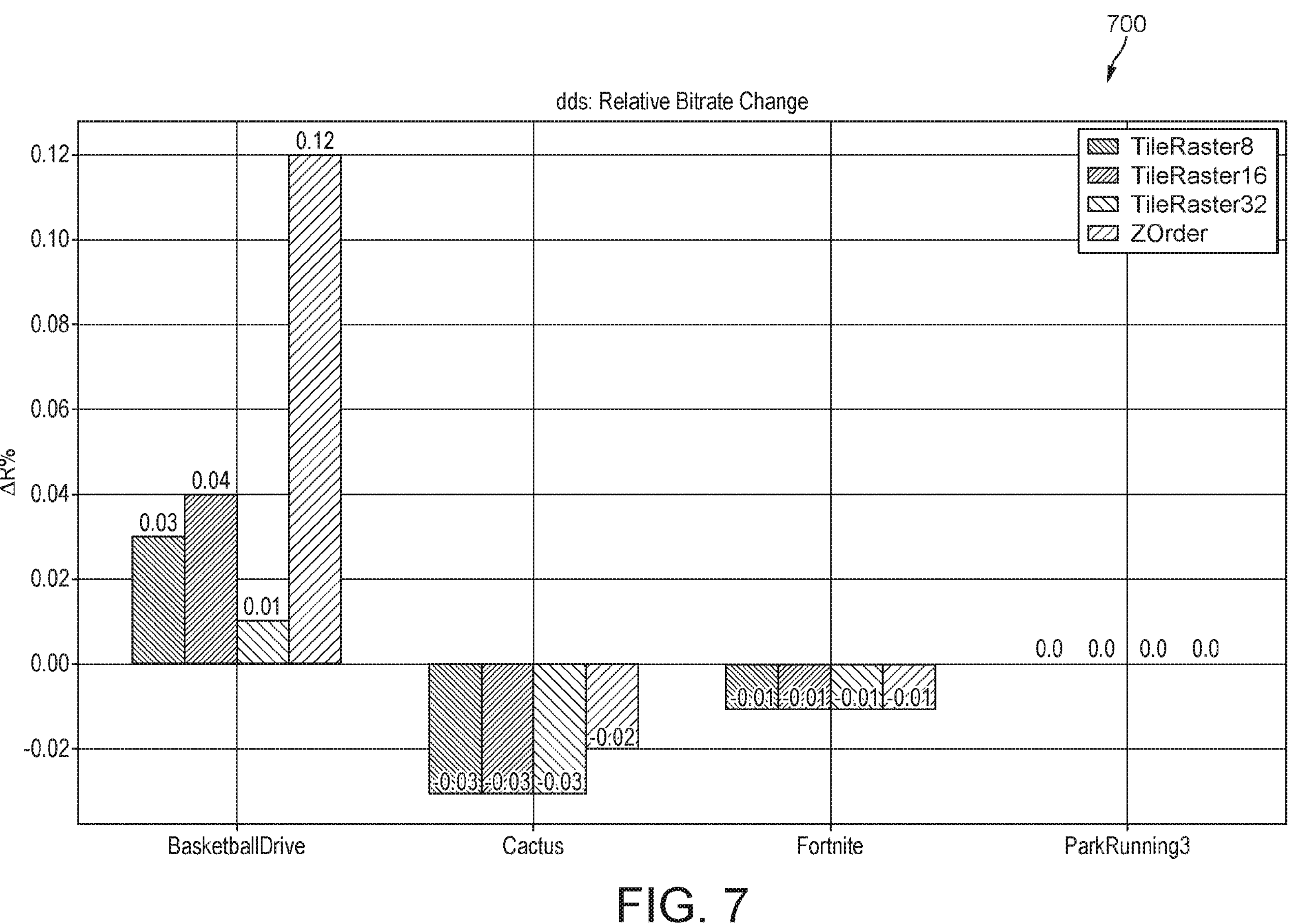

FIG. 6 shows test results 600 across the aforementioned four different content types of a DD transform and FIG. 7 shows test results 700 for a DDS transform. As may be seen bitrate improvements may vary with content type and read order type. Hence, improvements in bitrate may be obtained by selecting a particular readout order for a particular item of content, e.g. based on a test encoding at encoding time and/or previous experimental results.

Figure 8:
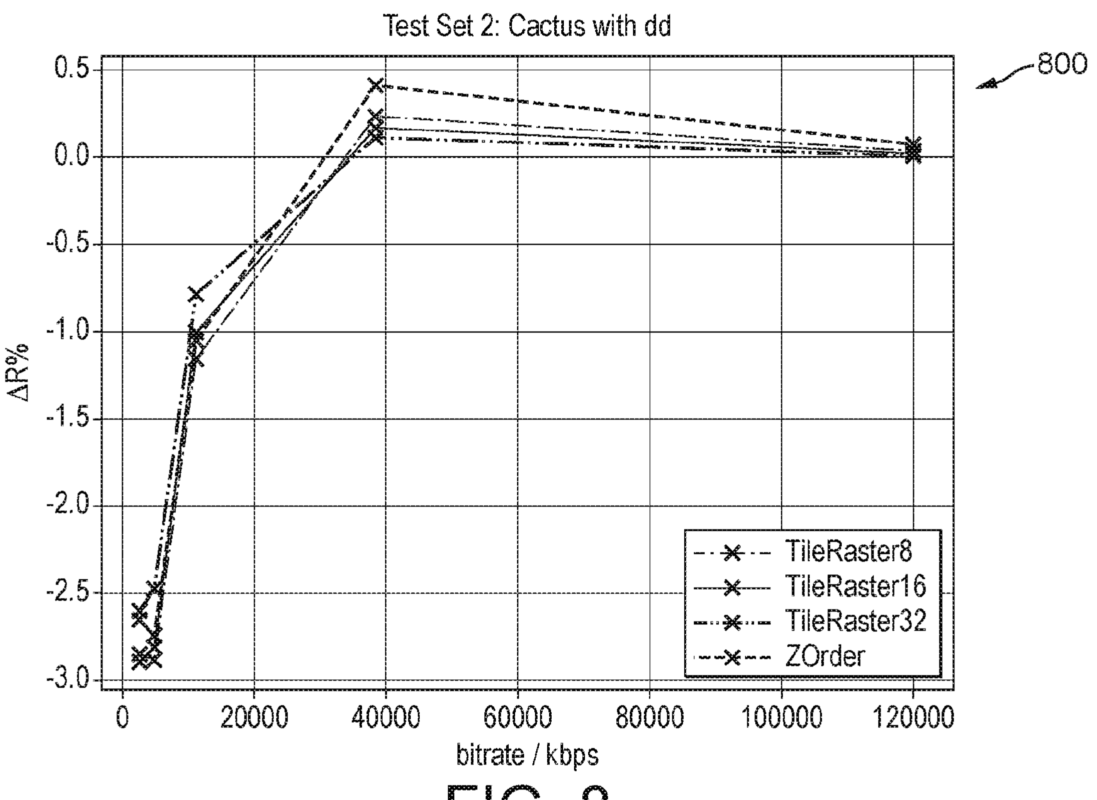
Figure 9:
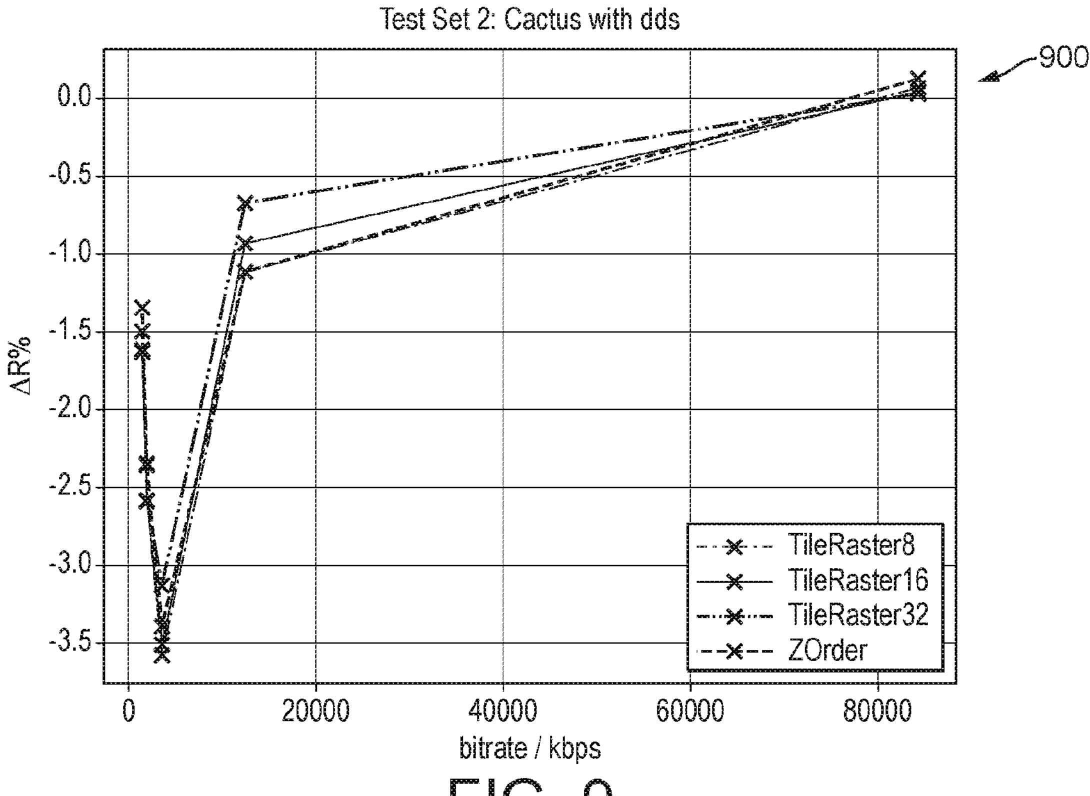
Figure 10:
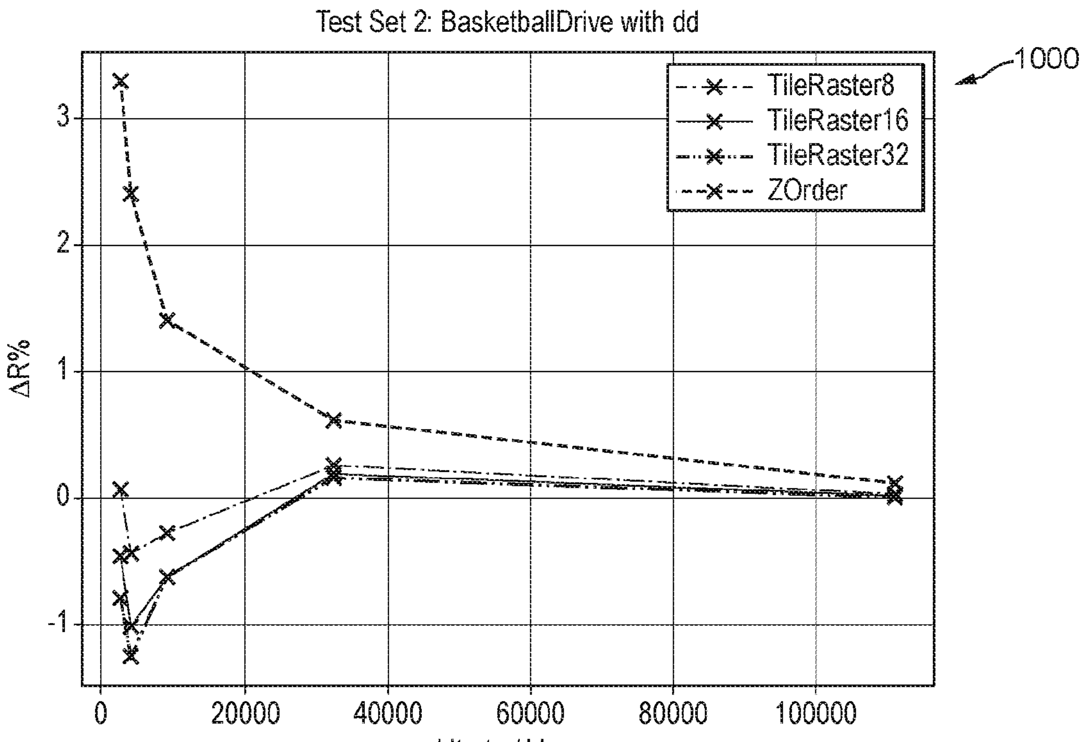
Figure 11:
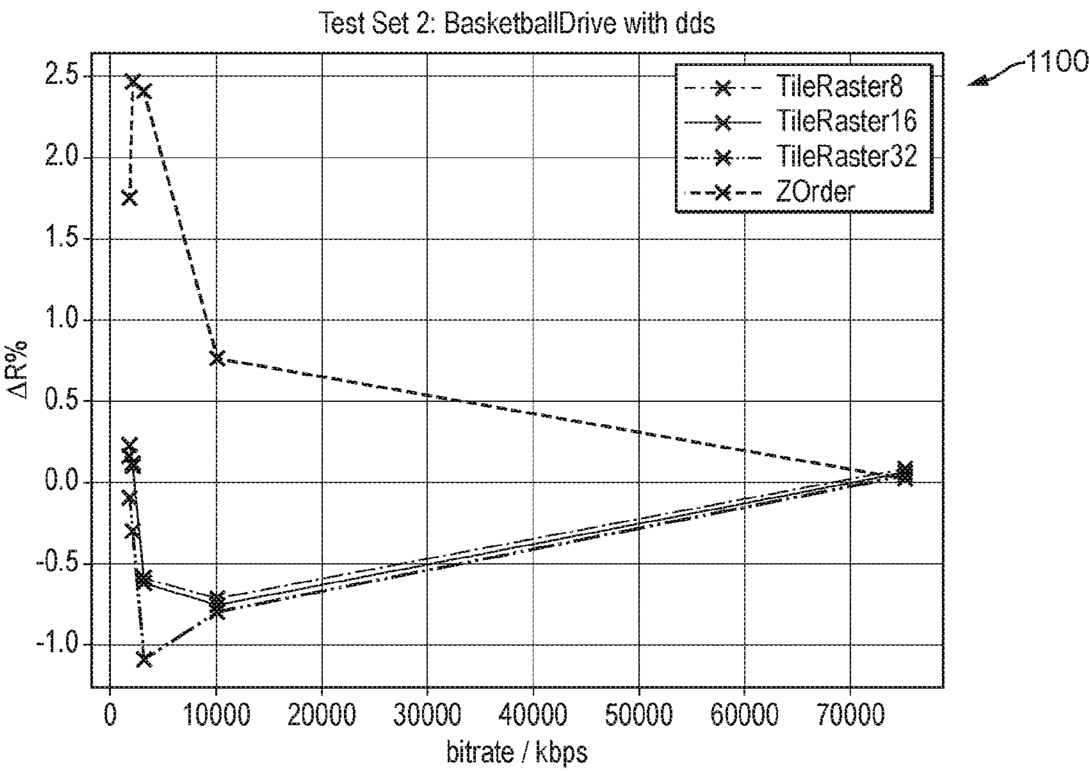
Figure 12:
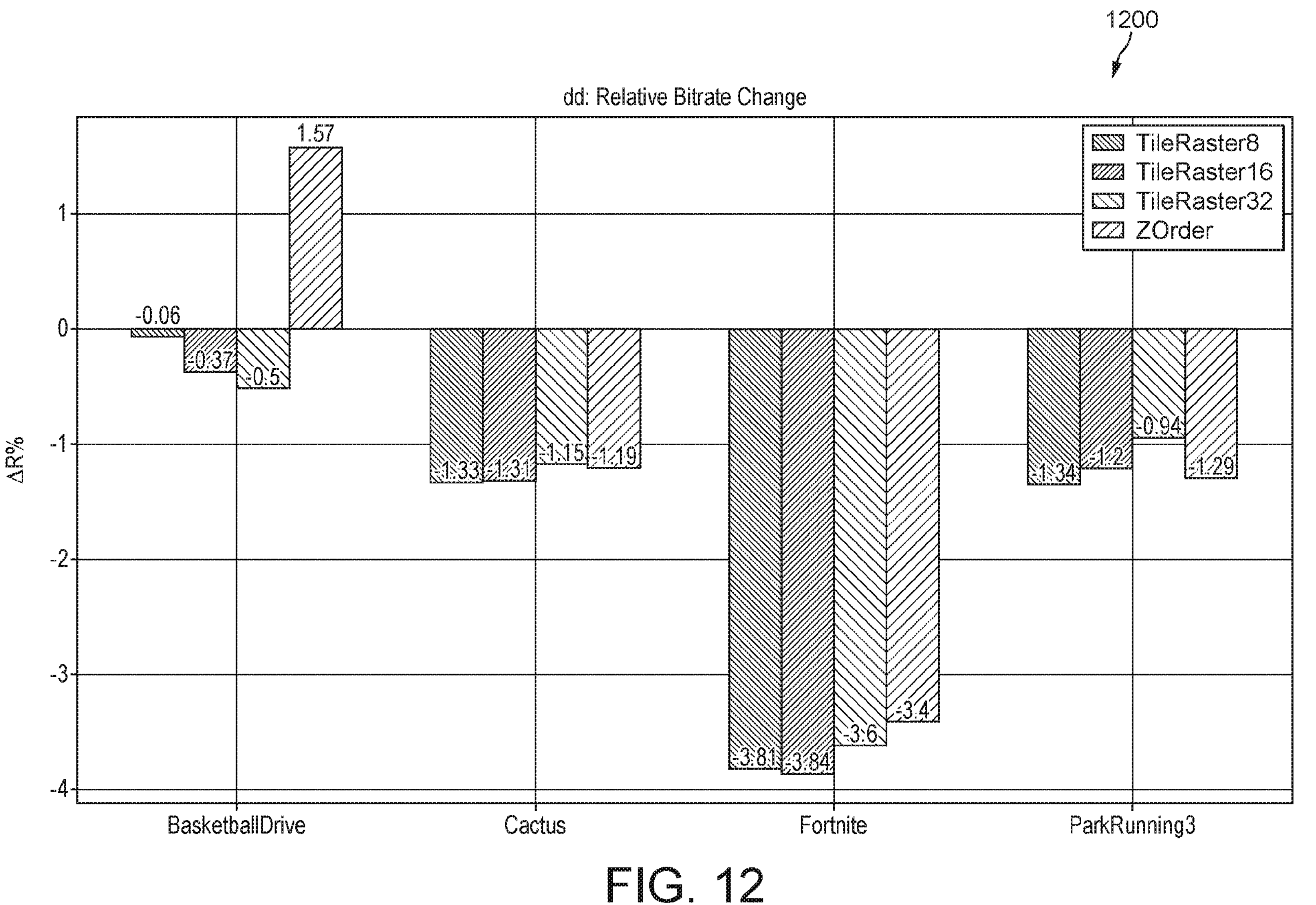
Figure 13:
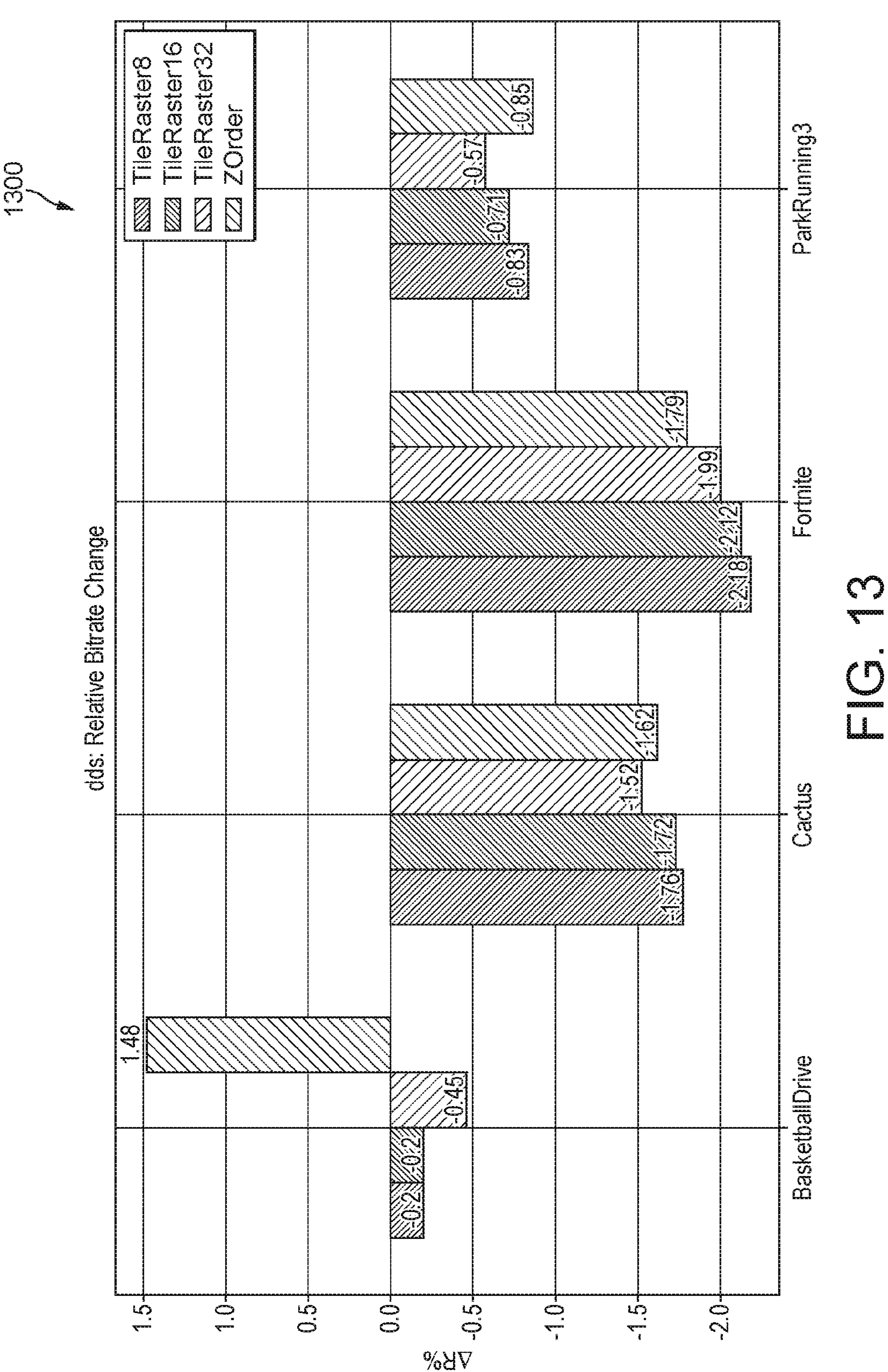
Figure 18:
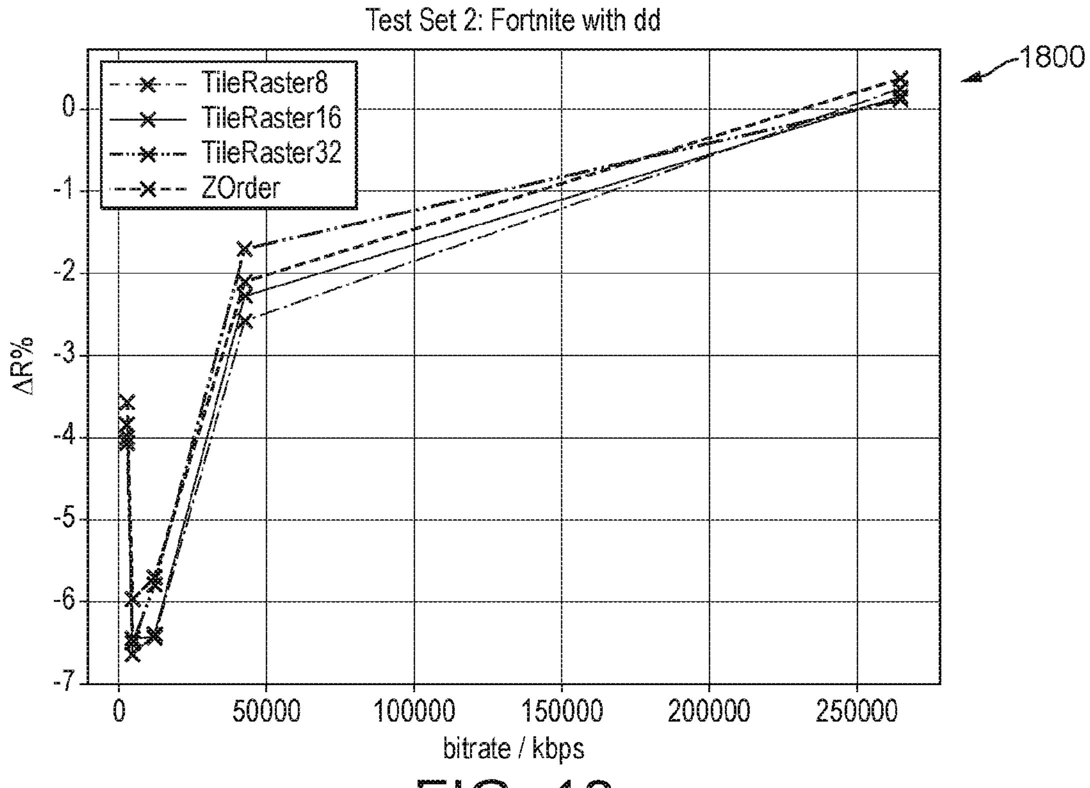
Figure 19:
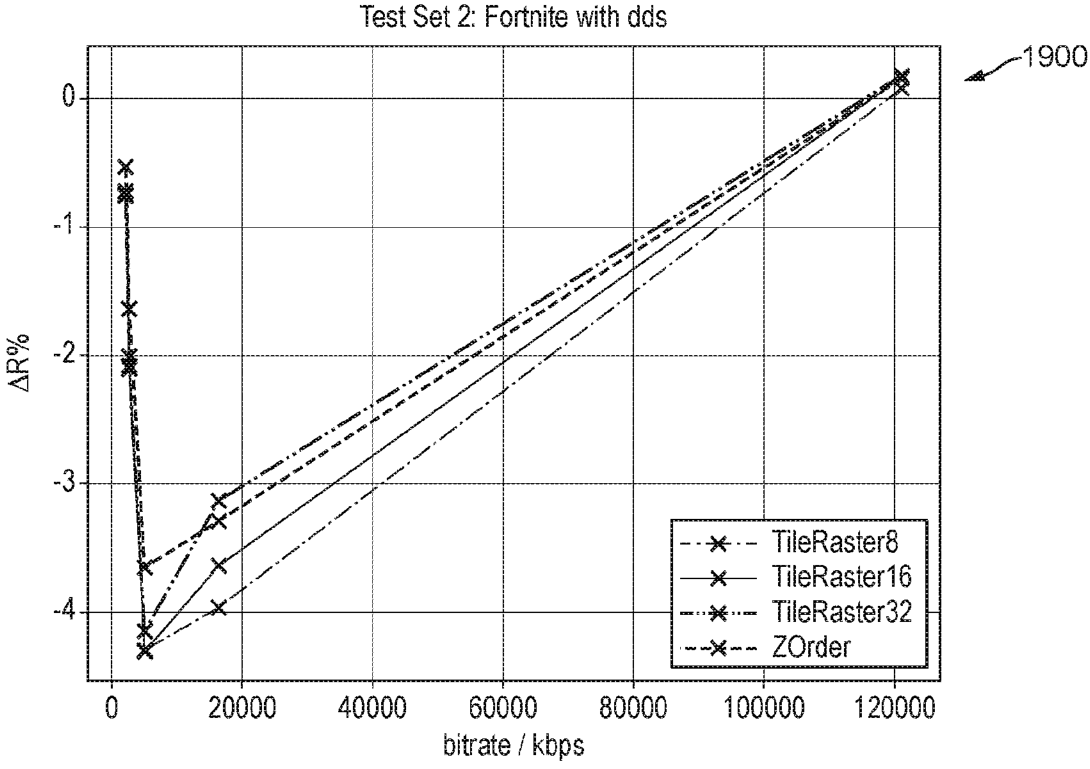
Figure 20:
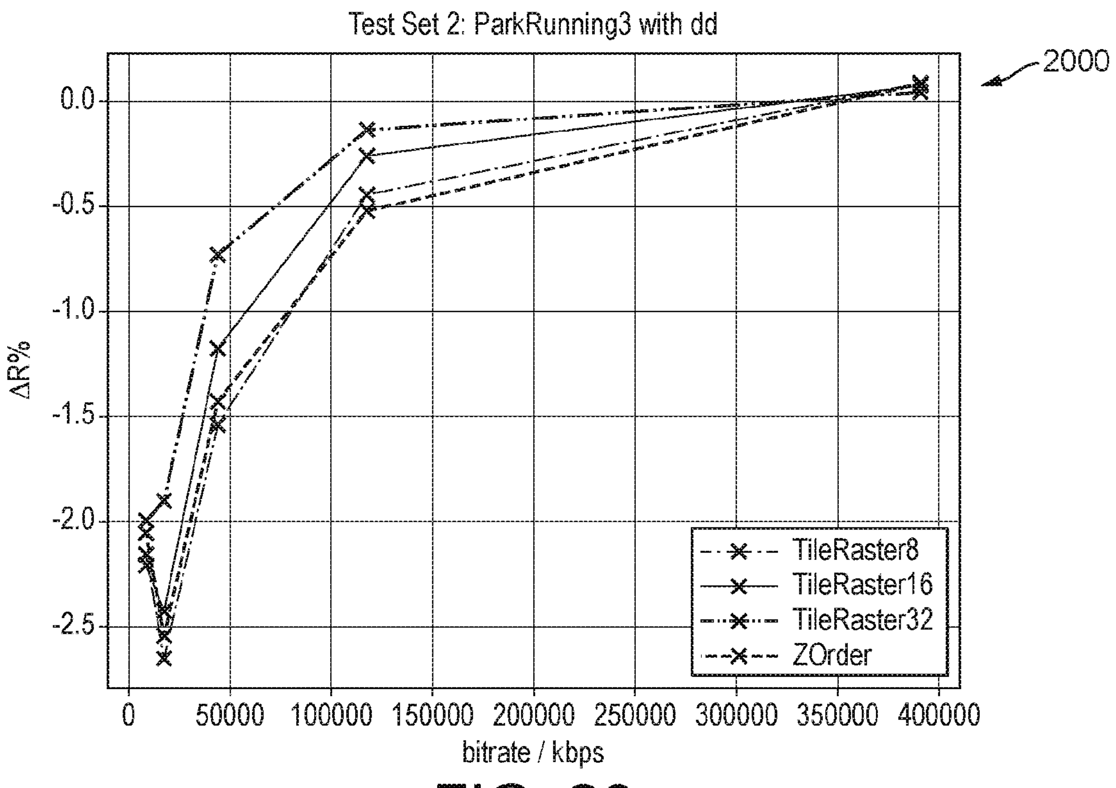
Figure 21:
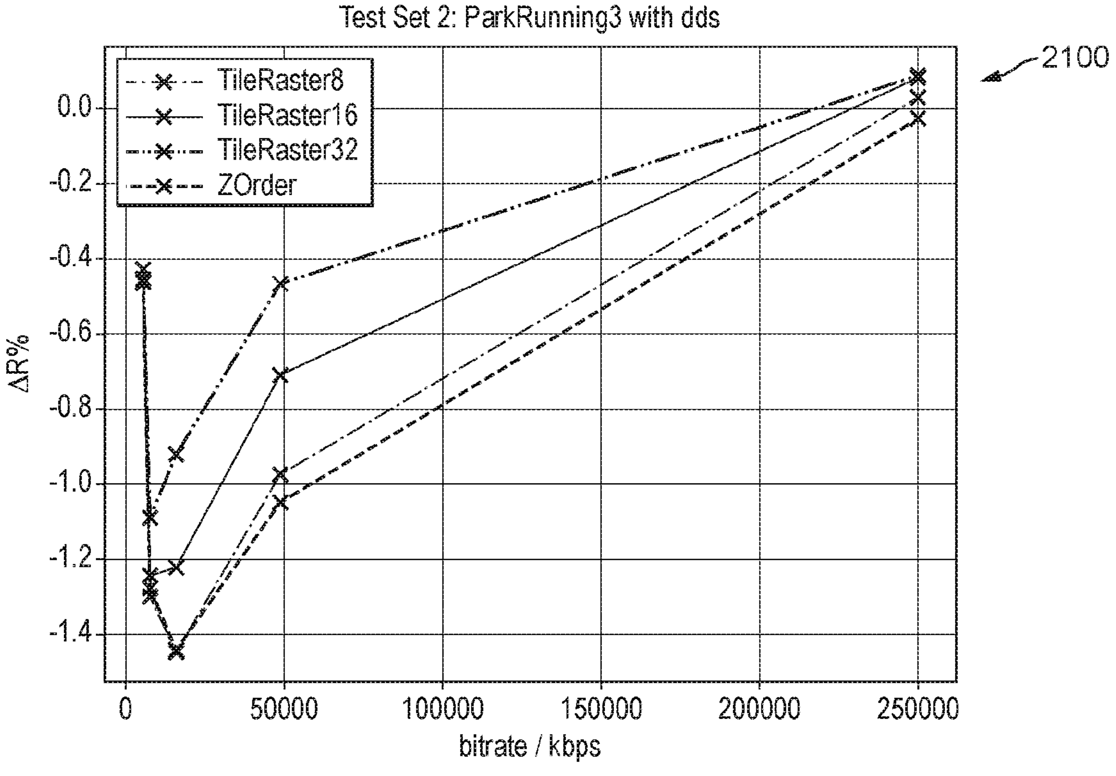

FIGS. 8 and 9 show results 800 and 900 similar to results 200 and 300 but for a different range of target bitrates (implemented via a different set of quantisation parameters). Similarly, FIGS. 10 and 11 show results 1000 and 1100 similar to results 400 and 500, FIGS. 18 and 19 show results 1800 and 1900 similar to results 1400 and 1500, and FIGS. 20 and 21 show results 2000 and 2100 similar to results 1600 and 1700 but for a different range of target bitrates. FIGS. 12 and 13 respectively show results 1200 and 1300 for the DD and DDS transform across the second, different range of target bitrates.

It will be appreciated that embodiments of the present disclosure, namely advanced encoders are susceptible to being implemented in custom digital circuits, for example, gate arrays, FPGA's and similar; alternatively, embodiments of the present disclosure are susceptible to being implemented using computing hardware, for example multi-core processors, that, when in operation, execute one or more software products including machine-executable instructions.

Such aforesaid tiled or "Z"-order readout of Hadamard transform coefficients is capable of being used in both encoders and corresponding decoders for achieving an enhanced degree of data compression when communicating image or video content via data communication networks, for example via the Internet®.

It will be appreciated that each of 4 DD components or 16 DDS components, when encoding arrays of transformed residual data, is traditionally separately coded (i.e., as a set of 4 or 16 surfaces) using run-length encoding, prior to compression via variable length encoding (or other entropy encoding techniques such as arithmetic or range encoding). Whilst the compression introduced by such a second step has little or no dependence on the order of the data in the DD or DDS component, the compression potentially introduced by the first step is expected to depend on the order.

For example, if a same given value occurs twice in a DD component (hereinafter "surface"), there will not be any benefit of run-length compression if the occurrences are separated from each other. If, on the other hand, the scan pattern of the data has been fortuitously chosen so that the repeated values are read into the runlength encoder in immediate succession, the size of the second symbol is saved and in its place is the cost of specifying run length of 2. Commonly, 2D arrays such as surfaces are scanned in raster order. This allows long runs of identical values to be next to each other. However, practical images have natural or measurement noise and have shorter runs, so that it is only after heavy quantization (with large stepwidths) that long runs appear, if at all. Quantization parameters are sometimes varied between patches of an image, which is one reason why a different order as employed in embodiments of the present disclosure are potentially beneficial to assist run-length encoding.

Embodiments of the present disclosure thus beneficially employ of allowing a given encoder to switch between different ordering modes when encoding elements besides full raster, in order to reduce bitrate or file size at no change in quality. The improved mode of element readout is optionally hard-coded (for example, incorporated into a FPGA used to implement the given encoder) or determined by intelligent online assessment of the data (for example, using software executable by computing hardware to perform the assessment, for example using machine learning/artificial intelligence (ML/AI) that is able to learn iteratively a best strategy for selecting between modes in response to different value distributions occurring in elements to be encoded)). In the case of hard coding, the decoder must use the hard-coded order of the decoder, per channel. Otherwise, the order must be signalled via metadata in the encoded bitstream supplied from the given encoder to a corresponding decoder.

One example of a more local order is Z-order, for example as aforementioned. Another example is where the array is tiled in similar tiles and the data is ordered firstly by raster order of tile and then by raster order within tile. From practical experience implementing embodiments of the present disclosure, tile-size affects are observed, and in certain cases tile raster order is preferred over Z-order. The trade-off of whether to employ a Z-order readout as opposed to tile-readout may be selected dependent on the quantization step-widths: in a lossless mode (e.g., with a quantisation step-width of 1), the benefit of implementing mode-selection may be small but may increase as step-widths are varied (e.g., as shown in the charts).

Whilst ordering/traversal in real (image) space is well known, the idea of different orderings in DD component spaces (as employed in embodiments of the present disclosure) is not obvious and the benefits on compression can be immense. An encoder could, instead of independently deciding the order(s) in use for surfaces on a per frame basis, decide that it will use a pre-defined policy. The policy beneficially switches orderings based on the entropy or statistical distribution of the surface data. Beneficially, the bitstream generated by the encoder signals to the decoder, whether or not any of the orderings have to be changed between frames.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A method for encoding input data in an encoder to generate encoded output data, the method comprising:

converting input data into base-layer reconstruction data using a down-sampled version of the input data;

generating enhancement-layer data that provides instructions for enhancing the base-layer reconstruction data, wherein the enhancement-layer data comprises residual data representing a difference between a reconstruction generated from the base-layer reconstruction data and data derived from the input data;

subjecting the residual data to a Hadamard transform to convert the residual data to corresponding transform coefficients, wherein different output elements of the Hadamard transform are arranged as different surfaces to be encoded, each surface corresponding to a respective directional component of the transform, and wherein an output order traverses transform coefficients across multiple ones of the surfaces;

selecting the output order for the transform coefficients in the surfaces to provide an ordered sequence of transform coefficients for at least one data compression method, wherein the selected output order is one of a tile raster order and an n-by-n block "Z"-order, and wherein the selected output order operates over groups of coefficients spanning multiple surfaces and multiple coding units and is chosen based on content-dependent spatial-correlation characteristics of the residual data; and subjecting the ordered sequence of transform coefficients to the at least one data compression method to generate encoded output data.

2. The method of claim 1, wherein the at least one data compression method includes run-length encoding (RLE) followed by Huffman encoding.

3. The method of claim 1, wherein method includes arranging for the tile raster order to include encoding tiles having a size in a range of 8×8 elements to 64×64 elements, wherein transform coefficients are selected in raster order within each tile.

4. The method of claim 3, wherein the tile raster order includes encoding tiles having a size of 8×8 elements, 16×16 elements, or 32×32 elements.

5. The method of claim 1, wherein the n-by-n block "Z"-order includes one or more n-by-n "Z"-order readouts from top-left coefficient to top-right coefficient to bottom-left coefficient to bottom-right coefficient in a given group of coefficients, wherein the n-by-n "Z"-order readouts are repeated in a recursive n-by-n "Z"-order across different groups of transformed coefficients.

6. The method of claim 1, wherein the method is implemented to be compatible with one of the VC-6 and LCEVC standards.

7. A computer program product comprising a non-transitory computer-readable storage medium having computer-readable instructions stored thereon, the computer-readable instructions being executable by a computerized device comprising processing hardware to execute the method of claim 1.

8. An encoder that, when in operation, encodes input data to generate corresponding encoded output data, wherein the encoder converts input data into base-layer reconstruction data using a down-sampled version of the input data, wherein the encoder generates enhancement-layer data that provides instructions for enhancing the down-sampled version of the input data, wherein the enhancement-layer data comprises residual data that represents a difference between a reconstruction generated from the base-layer reconstruction data and data derived from the input data, wherein the residual data are subjected in the encoder to a Hadamard transform to convert the residual data to corresponding Hadamard transform coefficients, wherein different output elements of the Hadamard transform are arranged as different surfaces to be encoded, each surface corresponding to a respective directional component of the transform, and wherein an output order traverses transform coefficients across multiple ones of the surfaces, wherein the encoder is configured to select an output order for the transform coefficients in the surfaces to provide an ordered sequence of transform coefficients for at least one data compression method, wherein the selected output order is one of a tile raster order and an n-by-n block "Z"-order, and wherein the selected output order operates over groups of coefficients spanning multiple surfaces and multiple coding units and is chosen based on content-dependent spatial-correlation characteristics of the residual data, and wherein the ordered sequence of transform coefficients are subjected to the at least one data compression method to generate the encoded output data.

9. The encoder of claim 8, wherein the at least one data compression transform includes run-length encoding (RLE) followed by a Huffman encoding.

10. The encoder of claim 8, wherein the tile raster order includes encoding tiles having a size in a range of 8×8 elements to 64×64 elements, wherein transform coefficients are selected in raster order within each tile.

11. The encoder of claim 10, wherein the tile manner includes encoding tiles having a size of 8×8 elements, 16×16 elements, or 32×32 elements.

12. The encoder of claim 8, the n-by-n block "Z"-order includes one or more n-by-n "Z"-order readouts from top-left coefficient to top-right coefficient to bottom-left coefficient to bottom-right coefficient in a given group of coefficients, wherein the n-by-n "Z order readouts are repeated in a recursive n-by-n "Z"-order across different groups of transformed coefficients.

13. The encoder of claim 8, wherein the encoder is implemented to be compatible with one of the VC-6 or LCEVC standards.

14. A method for decoding encoded data in a decoder to generate decoded output data, wherein the method comprises:

(i) receiving encoded data at the decoder;

(ii) applying an inverse transform to convert the received encoded data into enhancement-layer data that provides instructions for enhancing a base-layer reconstruction derived from a down-sampled version of the input data, wherein the enhancement-layer data comprises residual data to provide its enhancement, wherein the residual data are subjected to at least one transform and at least one data compression method to generate the received encoded data;

(iii) decompressing the received encoded data according to the at least one data compression method to generate intermediate decoded data; and (iv) arranging for the inverse transform to include an inverse Hadamard transform to convert transform coefficients derived from the intermediate decoded data into the residual data, wherein different output elements of the Hadamard transform represent different encoded surfaces, each surface corresponding to a respective directional component of the transform, and wherein an output order traverses transform coefficients across multiple ones of the surfaces, wherein a content-dependent readout order has been communicated to the decoder to allow a corresponding readout order by the decoder, and wherein the transform coefficients are decoded by being read according to the corresponding readout order, the corresponding readout order comprising a tile raster manner or an n-by-n block "Z"-order, the readout output order operating over groups of coefficients spanning multiple surfaces and multiple coding units and is based on content-dependent spatial-correlation characteristics of the residual data.

15. A computer program product comprising a non-transitory computer-readable storage medium having computer-readable instructions stored thereon, the computer-readable instructions being executable by a computerized device comprising processing hardware to execute the method of claim 14.

16. A decoder for decoding encoded data to generate decoded output data, wherein the decoder includes:

(i) an input for receiving encoded data;

(ii) a data processing arrangement for applying an inverse transform to convert the received encoded data into enhancement-layer data that provides instructions for enhancing a base-layer reconstruction derived from a down-sampled version of the input data, wherein the enhancement-layer data comprises residual data to provide its enhancement, wherein the residual data are subjected to at least one transform and at least one data compression method to generate the encoded data;

(iii) a decompression arrangement for decompressing the received encoded data using according to the at least one data compression method to generate intermediate decoded data; and (iv) an inverse transformation arrangement to apply the inverse transform as an inverse Hadamard transform to convert transform coefficients derived from the intermediate decoded data into the residual data, wherein different output elements of the Hadamard transform represent different encoded surfaces, each surface corresponding to a respective directional component of the transform, and wherein an output order traverses transform coefficients across multiple ones of the surfaces wherein the decoder is configured to receive a content-dependent readout order to allow a corresponding readout order by the decoder, and wherein the transform coefficients are decoded by being read according to the corresponding readout order, the corresponding readout order comprising a tile raster manner or a n-by-n block "Z"-order, the readout output order operating over groups of coefficients spanning multiple surfaces and multiple coding units and is based on content-dependent spatial-correlation characteristics of the residual data.

* * * * *